United States Patent
Thomas et al.

(10) Patent No.: US 12,192,247 B2
(45) Date of Patent: *Jan. 7, 2025

(54) SYSTEMS AND METHODS FOR NETWORK SECURITY

(71) Applicant: Sophos Limited, Abingdon (GB)

(72) Inventors: Andy Thomas, Long Wittenham (GB); Nishit Shah, Ahmedabad (IN); Daniel Stutz, Karlsruhe (DE)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,041

(22) Filed: Oct. 9, 2023

(65) Prior Publication Data
US 2024/0106863 A1 Mar. 28, 2024

Related U.S. Application Data

(63) Continuation of application No. 17/154,808, filed on Jan. 21, 2021, now Pat. No. 11,792,228.

(30) Foreign Application Priority Data

Jan. 22, 2020 (IN) .............................. 202011002757

(51) Int. Cl.
*H04L 9/40* (2022.01)
*G06F 9/50* (2006.01)

(52) U.S. Cl.
CPC ............ *H04L 63/20* (2013.01); *G06F 9/5027* (2013.01); *H04L 63/02* (2013.01); *H04L 63/1408* (2013.01)

(58) Field of Classification Search
CPC ..... H04L 63/20; H04L 63/02; H04L 63/1408; G06F 9/5027
See application file for complete search history.

(56) References Cited

U.S. PATENT DOCUMENTS

| | | | |
|---|---|---|---|
| 6,816,973 B1 * | 11/2004 | Gleichauf | H04L 63/0263 726/13 |
| 9,503,241 B2 | 11/2016 | Liang | |
| 10,250,466 B2 * | 4/2019 | Pasupathy | H04L 47/10 |
| 10,944,793 B2 | 3/2021 | Nimmagadda et al. | |
| 2009/0259838 A1 * | 10/2009 | Lin | H04L 9/3215 713/150 |
| 2015/0188949 A1 * | 7/2015 | Mahaffey | H04L 41/0894 726/1 |
| 2015/0326528 A1 * | 11/2015 | Murthy | H04L 63/20 726/1 |

(Continued)

OTHER PUBLICATIONS

IPO, First Examination Report for Indian Patent Application No. 202011002757, Aug. 26, 2021, 6 pages.

(Continued)

*Primary Examiner* — Kambiz Zand
*Assistant Examiner* — Afaq Ali
(74) *Attorney, Agent, or Firm* — IP Spring

(57) ABSTRACT

Methods, systems, and computer readable media for network security are described. In some implementations, security tasks and roles can be allocated between an endpoint device and a firewall device based on tag information sent from the endpoint, the tag information including one or more characteristics of a traffic flow, information of resource availability, and/or reputation of a process associated with a traffic flow.

20 Claims, 11 Drawing Sheets

(56) References Cited

U.S. PATENT DOCUMENTS

| | | | |
|---|---|---|---|
| 2016/0006698 A1* | 1/2016 | Kushwaha | H04L 63/1408 |
| | | | 726/12 |
| 2016/0294858 A1* | 10/2016 | Woolward | H04L 63/0263 |
| 2016/0315819 A1* | 10/2016 | Dara | H04L 41/28 |
| 2017/0132043 A1* | 5/2017 | Farhan | G06F 9/5044 |
| 2017/0264628 A1 | 9/2017 | Treat et al. | |
| 2017/0310708 A1* | 10/2017 | Schiappa | H04L 9/3247 |
| 2018/0181763 A1* | 6/2018 | Gunda | G06F 21/50 |
| 2018/0183759 A1 | 6/2018 | Gunda et al. | |
| 2018/0183832 A1* | 6/2018 | Chang | H04L 63/08 |
| 2020/0007360 A1 | 1/2020 | Turner et al. | |
| 2020/0296139 A1 | 9/2020 | Fainberg | |

OTHER PUBLICATIONS

IPO, Second Office Action Report for Indian Patent Application No. 202011002757, Apr. 21, 2023, 3 pages.

* cited by examiner

SYSTEMS AND METHODS FOR NETWORK SECURITY

CROSS-REFERENCE TO RELATED APPLICATIONS

This application claims priority to U.S. application Ser. No. 17/154,808, entitled "Systems and Methods for Network Security", filed Jan. 21, 2021, which claims priority to Indian Patent Application No. 202011002757, entitled, "Systems and Methods for Network Security," filed Jan. 22, 2020, which are incorporated herein by reference in their entirety.

TECHNICAL FIELD

Implementations relate generally to computer networks, and more particularly, but not exclusively, to methods, systems and computer readable media for network security including security task coordination between endpoint devices, network devices, and cloud-based threat management systems.

BACKGROUND

Devices that can access networks via wired or wireless connections have proliferated. Consequently, the variety of threats, devices, applications, and communication protocols has also increased. Implementing and maintaining effective network security in dynamic and rapidly changing network environments can be a challenge. Implementations were conceived in light of the above-mentioned needs, challenges and/or limitations, among other things.

SUMMARY

In general, some implementations may include systems and methods to coordinate performance of network security related tasks between endpoint devices and a network device such as a firewall.

One or more implementations may include methods, systems and computer readable media for network security. Some implementations may include a method. The method may include receiving, by a network device configured to perform a plurality of security tasks, from an endpoint device coupled to the network device via a network, tag information about traffic flow from the endpoint device to the network device over the network, wherein the tag information includes one or more characteristics of the traffic flow, and identifying, by the network device, a subset of the plurality of security tasks to be performed for the traffic flow, based at least in part on the tag information, wherein the subset excludes at least one security task of the plurality of security tasks. The method can also include performing for the traffic flow, by the network device, each task in the subset of the plurality of security tasks. In some implementations, the tag information can be determined based on one or more of: identity information of a process executing on the endpoint device that generates the traffic flow, dynamic information of the process, or one or more actions performed by the endpoint device. In some implementations, the one or more actions can include a security action, and wherein the at least one security task that is excluded is duplicative of the security action.

The method can also include analyzing the tag information to determine characteristics of the traffic flow before the traffic flow is received. In some implementations, receiving the tag information includes receiving an in-band message from the endpoint device, wherein the in-band message is included in a first packet of the traffic flow or is received prior to receipt of the first packet of the traffic flow.

In some implementations, receiving the tag information includes receiving an out-of-band message from the endpoint device, wherein the out-of-band message is distinct from the traffic flow. The method can further include sending a confirmation to the endpoint device that the out-of-band message was received, wherein further packets of the traffic flow are only received after sending the confirmation.

In some implementations, the network device is a firewall device that includes a hardware accelerator, and wherein at least one task of the subset of the plurality of security tasks is performed by the hardware accelerator. In some implementations, determining the subset of the plurality of security tasks includes determining a level of security based on the tag information, wherein tasks in the subset of the plurality of security tasks correspond to the level of security.

In some implementations, the tag information can be received as part of a synchronized security message from the endpoint device to the network device. In some implementations, selecting the subset of the plurality of security tasks is based on one or more network device settings.

Some implementations can include a computer-implemented method. The method can include generating, at an endpoint device, tag information about a traffic flow from the endpoint device to a network device over the network, wherein the tag information includes one or more characteristics of the traffic flow, and buffering, at the endpoint device, the traffic flow. The method can also include communicating, from the endpoint device to the network device, the tag information prior to the traffic flow being sent from the endpoint device to the network device, and receiving, at the endpoint device, an indication of a subset of a plurality of security tasks to be performed for the traffic flow at the endpoint, based at least in part on the tag information, wherein the subset excludes at least one security task of the plurality of security tasks.

The method can further include performing for the traffic flow, by the endpoint device, each task in the subset of the plurality of security tasks. In some implementations, the tag information is determined based on one or more of identity information of a process executing on the endpoint device that generates the traffic flow, dynamic information of the process, or one or more actions performed by the endpoint device.

In some implementations, the one or more actions can include a security action, and wherein the at least one security task that is excluded is duplicative of the security action. In some implementations, generating the tag information can include associating dynamic information about the traffic flow with the traffic flow prior to sending the traffic flow to the network device.

In some implementations, transmitting the tag information can include transmitting an in-band message from the endpoint device, wherein the in-band message is included in a first packet of the traffic flow or is transmitted prior to transmission of the first packet of the traffic flow.

In some implementations, transmitting the tag information includes transmitting an out-of-band message from the endpoint device, wherein the out-of-band message is distinct from the traffic flow. The method can further include buffering one or more packets of the traffic flow at the endpoint device until the network device processes the out-of-band message. In some implementations, the tag information is transmitted as part of a synchronized security message from the endpoint device to the network device.

Some implementations can include a computer-implemented method receiving, by a network device configured to perform a plurality of security tasks, from an endpoint device coupled to the network device via a network, tag information about a traffic flow from the endpoint device to the network device over the network, wherein the tag information includes endpoint device resource information, and identifying, by the network device, a subset of the plurality of security tasks to be performed for the traffic flow, based at least in part on the tag information, wherein the subset excludes at least one security task of the plurality of security tasks. The method can also include performing for the traffic flow, by the network device, each task in the subset of the plurality of security tasks.

In some implementations, the tag information can include one of static information about endpoint resources with the traffic flow prior to sending the traffic flow to the network device, or dynamic information about endpoint resources with the traffic flow prior to sending the traffic flow to the network device, wherein the dynamic information includes user state information. In some implementations, the plurality of security tasks can include a security action, and wherein the at least one security task that is excluded is duplicative of the security action.

The method can further include analyzing the tag information to determine characteristics of the traffic flow before the traffic flow is received. In some implementations, receiving the tag information includes receiving an in-band message from the endpoint device, wherein the in-band message is included in a first packet of the traffic flow or is received prior to receipt of the first packet of the traffic flow. In some implementations, receiving the tag information can include receiving an out-of-band message from the endpoint device, wherein the out-of-band message is distinct from the traffic flow.

The method can also include sending a confirmation to the endpoint device that the out-of-band message was received, wherein further packets of the traffic flow are only received after sending the confirmation. In some implementations, the network device can include a firewall device that includes a hardware accelerator, and wherein at least one task of the subset of the plurality of security tasks is performed by the hardware accelerator.

In some implementations, determining the subset of the plurality of security tasks includes determining a level of security based on the tag information, wherein tasks in the subset of the plurality of security tasks correspond to the level of security. In some implementations, the tag information is received as part of a synchronized security message from the endpoint device to the network device. In some implementations, selecting the subset of the plurality of security tasks is based on one or more network device settings.

Some implementations can include a method. The method can include generating, at an endpoint device, tag information associated with a traffic flow from the endpoint device to a network device via a network, wherein the tag information includes endpoint device resource information. In some implementations, the generating can include associating static information about endpoint resources with the traffic flow prior to sending the traffic flow to the network device, or associating dynamic information about endpoint resources with the traffic flow prior to sending the traffic flow to the network device, wherein the dynamic information includes user state information.

The method can also include buffering, at the endpoint device, the traffic flow, and communicating, from the endpoint device to the network device, the tag information prior to the traffic flow being sent from the endpoint device to the network device. The method can further include dynamically adjusting the tag information to generate adjusted tag information based on a current state of endpoint device resources.

The method can also include performing, at the endpoint device, one or more security tasks, wherein the security tasks are selected based at least in part on available endpoint device resources, and the tag information can include information about the one or more security tasks.

The method can further include, if a change in endpoint device resources is determined based on the current state of endpoint device resources compared to a previous state of endpoint device resources, performing an adjusted set of one or more security tasks based on the change in endpoint device resources. In some implementations, associating dynamic information about endpoint resources includes associating traffic flow state information with the traffic flow prior to sending the traffic flow to the network device.

In some implementations, associating dynamic information about the endpoint resources includes associating endpoint device state information with the traffic flow prior to sending the traffic flow to the network device, wherein the endpoint device state information includes one or more of endpoint device health, endpoint device processor load, endpoint device memory usage, or a count of devices connected to the endpoint device. In some implementations, the tag information is transmitted as part of a synchronized security message from the endpoint device to the network device.

Some implementations can include a method. The method can include receiving, by a network device configured to perform a plurality of security tasks, from an endpoint device coupled to the network device via a network, tag information about traffic flow from the endpoint device to the network device over the network, wherein the tag information includes one or more of process reputation information about a process associated with the traffic flow, a process context of the process, or a data context of data within the traffic flow. The method can also include identifying, by the network device, a subset of the plurality of security tasks to be performed for the traffic flow, based at least in part on the tag information, wherein the subset excludes at least one security task of the plurality of security tasks, and performing for the traffic flow, by the network device, each task in the subset of the plurality of security tasks.

In some implementations, the tag information can include one of static information about endpoint resources with the traffic flow prior to sending the traffic flow to the network device, or dynamic information about endpoint resources with the traffic flow prior to sending the traffic flow to the network device, wherein the dynamic information includes user state information. In some implementations, the plurality of security tasks can include a security action, and wherein the at least one security task that is excluded is duplicative of the security action.

The method can also include analyzing the tag information to determine characteristics of the traffic flow before the traffic flow is received. In some implementations, receiving the tag information includes receiving an in-band message from the endpoint device, where the in-band message is included in a first packet of the traffic flow or is received prior to receipt of the first packet of the traffic flow.

In some implementations, receiving the tag information can include receiving an out-of-band message from the endpoint device, wherein the out-of-band message is distinct from the traffic flow. The method can further include sending a confirmation to the endpoint device that the out-of-band message was received, wherein further packets of the traffic flow are only received after sending the confirmation.

In some implementations, the network device can include a firewall device that includes a hardware accelerator, and wherein at least one task of the subset of the plurality of security tasks is performed by the hardware accelerator. In some implementations, determining the subset of the plurality of security tasks includes determining a level of security based on the tag information, where tasks in the subset of the plurality of security tasks correspond to the level of security.

In some implementations, the tag information is received as part of a synchronized security message from the endpoint device to the network device. In some implementations, selecting the subset of the plurality of security tasks is based on one or more network device settings.

Some implementations can include a method. The method can include generating, at an endpoint device, tag information associated with a traffic flow from the endpoint device to a network device via a network, wherein the tag information includes one or more of process reputation information about a process associated with the traffic flow, a process context of the process, or a data context of data within the traffic flow, and buffering, at the endpoint device, the traffic flow. The method can also include transmitting the tag information from the endpoint device to the network device. The method can further include performing, at the endpoint device, one or more security tasks. In some implementations, the tag information includes information about the one or more security tasks.

In some implementations, the process reputation information includes an indication of whether the process is well-signed or an indication of whether a request from the process is well-formed. In some implementations, generating the tag information includes providing connection reputation information corresponding to a destination of the traffic flow.

The method can also include communicating, from the endpoint device to the network device, informing the network device via the tag information to perform or not perform certain security tasks at the network device based on the process reputation information about a process associated with the traffic flow, the process context of the process, or the data context of data within the traffic flow. In some implementations, transmitting the tag information includes transmitting an in-band message from the endpoint device, wherein the in-band message is included in a first packet of the traffic flow or is transmitted prior to transmission of the first packet of the traffic flow.

In some implementations, transmitting the tag information includes transmitting an out-of-band message from the endpoint device, wherein the out-of-band message is distinct from the traffic flow. In some implementations, one or more packets of the traffic flow are buffered at the endpoint device until the network device processes the out-of-band message. In some implementations, the tag information is transmitted as part of a synchronized security message from the endpoint device to the network device.

Some implementations can include a system comprising an endpoint device configured to communicate over a network. The endpoint device can include an endpoint processor coupled to an endpoint computer readable medium having endpoint software instructions stored thereon that, when executed by the endpoint processor, cause the endpoint processor to perform endpoint network security operations. The endpoint operations can include generating tag information about a traffic flow, wherein the tag information includes one or more characteristics of the traffic flow, buffering the traffic flow, and communicating the tag information prior to the traffic flow being sent from the endpoint device via a network.

The system can include a network device configured to perform a plurality of security tasks and to communicate over the network, the network device can include a network device processor coupled to a network device computer readable medium having network device software instructions stored thereon that, when executed by the network device processor, cause the network device processor to perform network device network security operations. The network device network security operations can include receiving, from the endpoint device via the network, tag information about traffic flow from the endpoint device to the network device over the network, and identifying a subset of the plurality of security tasks to be performed for the traffic flow, based at least in part on the tag information, wherein the subset excludes at least one security task of the plurality of security tasks. The operations can also include performing for the traffic flow each task in the subset of the plurality of security tasks.

In some implementations, the endpoint device performs no security tasks, wherein the tag information indicates to the network device that the endpoint device performs no security tasks, and wherein the network device automatically determines and performs security tasks for traffic flow from the endpoint device. In some implementations, the endpoint device performs one or more security tasks, wherein the tag information indicates to the network device that the endpoint device has performed the one or more security tasks on the traffic flow, and wherein the network device automatically determines any non-redundant security tasks for the traffic flow and performs the non-redundant security tasks.

In some implementations, the endpoint device and the network device change roles for network security dynamically such that the network device performs the one or more security tasks and endpoint device performs any non-redundant security tasks. In some implementations, the network device instructs the endpoint device to perform additional tasks in response to one or more parameters, and wherein the one or more parameters include an indication of network device processor utilization, network device memory utilization, or traffic flow type.

In some implementations, the one or more security tasks include a security task that can be performed at the endpoint device or the network device. In some implementations, the one or more security tasks include a security task that is performed on a device selected based on device role. In some implementations, the network device is configured to make adjustments to tasks based on one or more of higher threat perception, change in configuration, or one or more device-specific factors.

DETAILED DESCRIPTION

Figure 1:
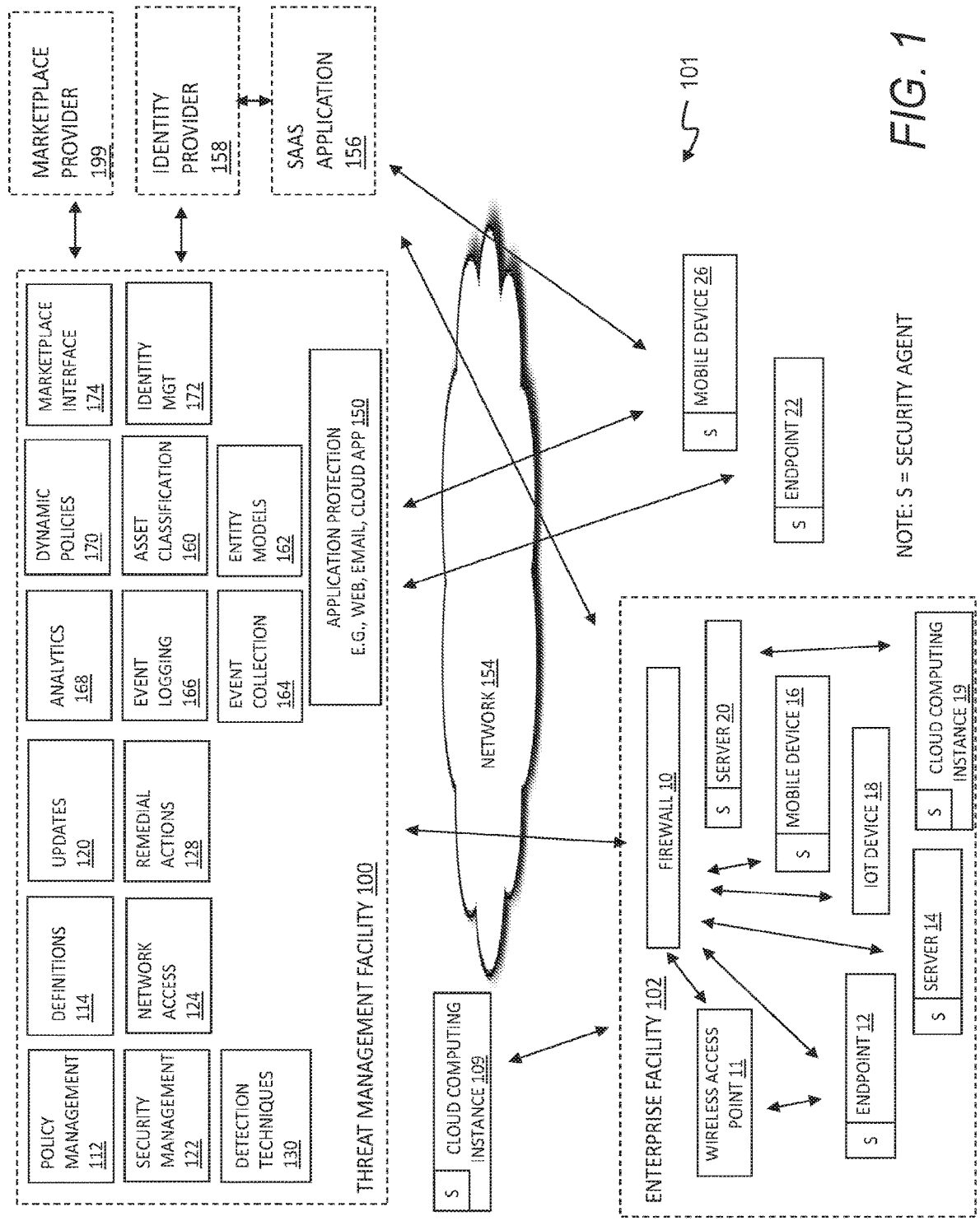
FIG. 1 is a diagram of a threat management system, in accordance with some implementations.

Implementations were conceived in light of the above-mentioned needs, challenges and/or limitations, among other things. In general, some implementations may help provide wireless computer network security through rogue device detection.

Implementations will now be described with reference to the accompanying figures. The foregoing may, however, be embodied in many different forms and should not be construed as limited to the illustrated implementations set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described implementations. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the implementations and does not pose a limitation on the scope of the implementations. No language in the specification should be construed as indicating any unclaimed element as essential to the practice of the implementations.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In various implementations, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus and located in one or in a plurality of geographical locations. The configuration of the enterprise facility as shown is merely exemplary and it will be understood that there may be any number of compute instances, less or more of each type of compute instances, and other types of compute instances. As shown, the exemplary enterprise facility 102 compute instances include a firewall 10, a wireless access point 11, an endpoint 12, a server 14, a mobile device 16, an appliance or Internet of Things (IOT) device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100 and/or 112-174 may be provided as part of a security agent S that is included in software running on a compute instance 10-26 within the enterprise facility. Some or all of one or more of the facilities 100 and/or 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In some implementations, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. A marketplace provider 199 may be selected from a number of providers in a marketplace of providers that are available for integration or collaboration via the marketplace interface facility 174. A given marketplace provider 199 may use the marketplace interface facility 174 even if not engaged or enabled from or in a marketplace. As non-limiting examples, the marketplace provider 199 may be a third party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In some implementations, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In some implementations, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In some implementations, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

In some implementations, aspects of the threat management facility 100 may be provided as a stand-alone solution. In other implementations, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In some implementations, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In some implementations, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In some implementations, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In some implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In some implementations, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In some implementations, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

In some implementations, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In some implementations, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In some implementations, a policy database may include one or more policies such as a block list, a blacklist, an allowed list, a white list, or more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

Policies can include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions but may otherwise preserve network bandwidth for other activities by restricting the use of IM to personnel that need access for a specific purpose. In some implementations, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In some implementations, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In some implementations, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In some implementations, the threat management facility 100 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In some implementations, the policy management facility 112 and the security facility 122 may work in concert with the update management facility 120 to provide information to the enterprise facility's 102 network and/or compute instances 10-26. In various implementations, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In some implementations, the threat management facility 100 and the compute instances 10-26 may be provided with new definitions periodically to include most recent threats. Updating of definitions may be managed by the update facility 120 and may be performed upon request from one of the compute instances 10-26, upon a push, or some combination. Updates may be performed upon a time period, on demand from a device 1026, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166. When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
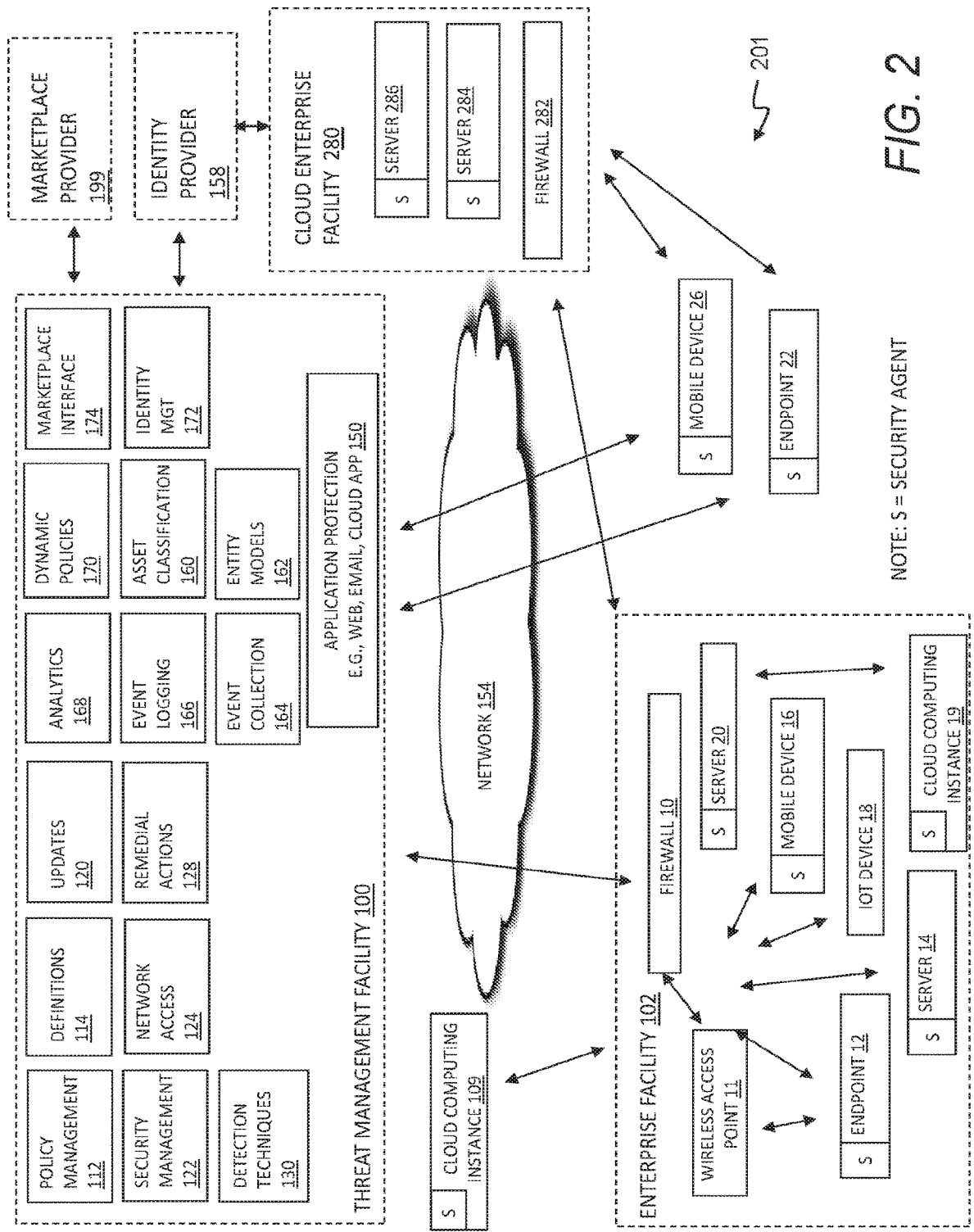
FIG. 2 is a diagram of a threat management system, in accordance with some implementations.

FIG. 2 depicts a block diagram of a threat management system 201, such as any of the threat management systems described herein, including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3A:
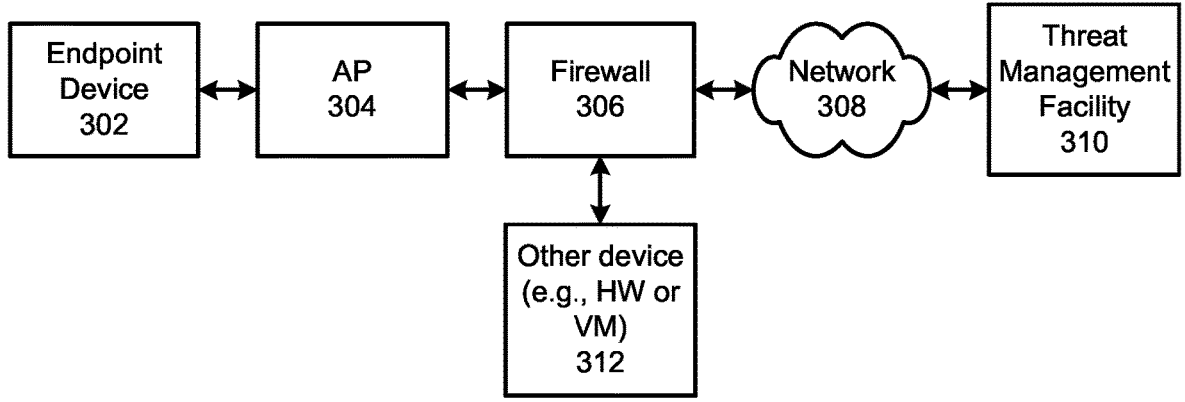
FIGS. 3A and 3B are diagrams of example endpoint device and firewall device configurations in accordance with some implementations.
Figure 3B:
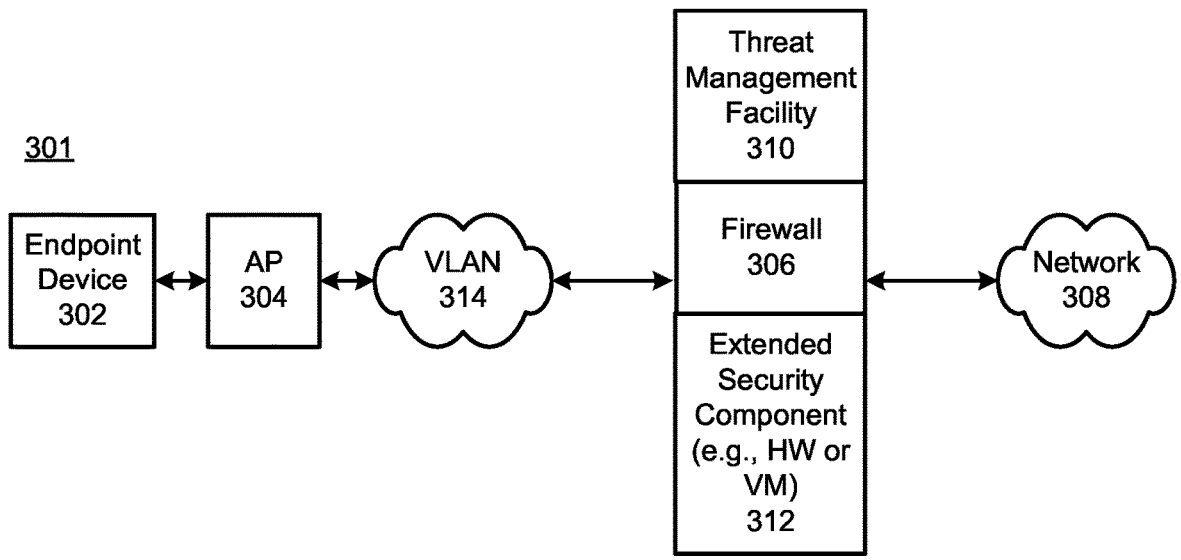

FIGS. 3A and 3B are diagrams of example network environments 300 and 301 that include an endpoint device and firewall device, in accordance with some implementations. For example, FIG. 3A shows an endpoint device 302, an optional access point (or AP) 304, a firewall 306, an external network 308 (e.g., the Internet), and a threat management facility 310 (e.g., similar to 100). The endpoint device 302, AP 304, and firewall 306 can be coupled via an internal network (e.g., a local area network, wireless network, or the like), a virtual network (e.g., a virtual local area network), etc. FIG. 3B shows the endpoint device 302 connected to the AP 304, which in turn is connected to a virtual local area network (or VLAN) 314. The VLAN 314 is connected to the threat management facility 310, firewall 306, and an optional extended security component 312. The firewall 306 connects the VLAN 314 to an external network 308 (e.g., the Internet). In some implementations, the firewall 306 and the extended security component 312 can be part of the threat management facility 310. In some implementations, the firewall 306, the extended security component 312, and the threat management facility 310 can be standalone components. In some implementations, the security task allocation can include distributing security tasks among two or more virtual machines (VMs). For example, a firewall may be executing on a VM for client on that VM. The system can determine a security task allocation based on the workload/traffic on the VM or other Vms. For instance, the system could start a new VM and allocate one or more security tasks to the new VM when the currently executing VM has a workload or traffic above a threshold level.

In operation, the endpoint device 302 can be configured to communicate over the network 308 via the AP 304 and firewall 306. The endpoint device 302 can include an endpoint processor coupled to an endpoint computer readable medium having endpoint software instructions stored thereon that, when executed by the endpoint processor, causes the endpoint processor to perform endpoint network security operations including generating tag information about a traffic flow. The tag information includes one or more characteristics of the traffic flow. The tag information is described in detail below in connection with FIG. 11.

The endpoint device 302 can buffer the traffic flow (e.g., store temporarily in a memory of the endpoint device 302) at a time the endpoint device communicates the tag information to a network device (e.g., firewall 306) and wait for a response from the network device. In some implementations, the endpoint device 302 can communicate the tag information prior to the traffic flow being sent from the endpoint device 302 to the firewall 306. Firewall 306 can be a standalone device or integrated with another device such as AP 304. The endpoint device 302 and the firewall 306 can be in communication with a cloud based threat management facility 310. The tag information can be transmitted as part of a status (or heartbeat) message between the endpoint 302, the firewall 306, and/or the threat management facility 310.

The endpoint device 302 and the firewall 306 (or other network device) can each be configured to perform a plurality of security tasks and to communicate over the network. The endpoint device 302 and the firewall 306 may perform security tasks specific to each device or may perform overlapping security tasks (e.g., may perform one or more of the same security tasks). For example, some security tasks may be device-agnostic and can be performed at either the endpoint device or the network device. Some security tasks are dependent on device role in the network and are advantageously (or only) performed at specific device types. The network device may make adjustments to security tasks (and security task allocation among devices) based on other factors such as higher threat perception (e.g., based on other traffic flows received), change in configuration (e.g., administrator settings), device-specific factors (e.g., software/hardware version, time since device joined network, etc.).

Within the threat management facility (e.g., 100 or 310), network traffic flow can be routed over one or more components or subcomponents of the threat management facility and the threat management facility can perform security functions. In some implementations, the threat management facility (e.g., 100 or 310) can set policy for the firewall 306, endpoint 302 or other devices 312 (e.g., via policy management module 112) or perform one or more security tasks or portions of a security task (e.g., via application protection module 150, which can include a firewall or functions of a firewall). In some implementations, the threat management facility (e.g., 100 or 310) can provide threat detection and enforcement capabilities.

The allocation of security tasks between an endpoint 302, firewall 306 (or other network device), and a threat management facility (e.g., 100 or 310) can be controlled in a number of ways. For example, a policy set by a user can specify which device should perform security task processing. In another example, the security task processing allocation can be performed using a semi-automated technique including monitoring the network traffic, detecting a possible threat and requesting user input as to how to perform the security task processing for the possible threat. In yet another example, the security task processing can be fully automated, e.g., if a detected event or pattern in a traffic flow reaches a threshold level of suspicion, then the system via the threat management facility can automatically rearrange the security task processing allocation to help provide network security. The firewall, other network device, threat management facility, etc. can include a virtual machine instance.

In some implementations, the network device (e.g., firewall or other device) can include a network device processor coupled to a network device computer readable medium having network device software instructions stored thereon that, when executed by the network device processor, cause the network device (e.g., 306) processor to perform network device network security operations. The operations can include receiving, from the endpoint device 302 via a network (e.g., an internal wireless or wired network such as a LAN or Wi-Fi), tag information about a traffic flow being sent from the endpoint device 302 to the network device 306 over the network. The operations can also include identifying a subset of the plurality of security tasks to be performed for the traffic flow, based at least in part on the tag information, wherein the subset excludes at least one security task of the plurality of security tasks. The operations can further include performing, for the traffic flow, each task in the subset of the plurality of security tasks. For example, the endpoint device may perform a security task and communicate that information to the network device (e.g., firewall 306) via the tag information In some implementations, the endpoint device 302 may perform no security tasks. This may occur in situations in which the endpoint device 302 has limited resources, e.g., is an Internet-of-Things (IoT) device with limited processing or memory resources, or one having high processor or memory utilization that may prevent timely completion of security tasks. The endpoint device can communicate the absence of security task processing at the endpoint device to the network device via the tag information, which can indicate to the network device that the endpoint device is not performing any security tasks. The network device can automatically determine the situation and perform security tasks for traffic flow exclusively at the network device.

In some implementations, a security platform may use a sensor-event-analysis-response methodology to iteratively adapt to a changing security environment by continuously creating and updating entity models based on observed activities and detecting patterns of events that deviate from these entity models.

Security tasks can include receiving data from a sensor, detecting events, analyzing the detected events to identify a threat or a potential threat by comparing content and/or behavior associated with a detected event with a baseline of content and/or behavior for a given event, and responding to the detecting events. In some implementations, an entity model can be built that can contain a schema or the like describing events associated with an entity (or a type of entity), along with information about normal or expected behavior for each event associated with the entity. In one aspect, an entity type (e.g., laptop, or laptop by manufacturer X, or virtual machine in environment Y) may be used to select a schema for an entity model, while activities of a particular instances of that entity type may be used to generate the baseline for the entity model used in detections and the like. Thus, for example, if a user installs an office productivity suite, an entity model for that entity type may be selected based on the types of events known to be associated with the use the application, or the capabilities of the application. However, different users may use the software differently, so the baseline of expected behavior may be evaluated for a particular installation of the application by monitoring activity of the application over time. In another aspect, the schema for an entity model may itself be extensible. That is, the schema of different events may be created based on observations of activity associated with the entity.

When a new type of event is detected for that entity, the event may be added to the schema for a corresponding entity type.

Once an entity model has been created and a stable baseline established, the entity model may be deployed for use in monitoring prospective activity. This monitoring may, for example, use the same event stream (e.g., network traffic flow) that was used to create the entity model, or a filtered or otherwise processed version of the event stream. It will be appreciated that the entity models may generally be deployed as fixed or relatively static or discrete models, or any one or more of the entity models may be continuously updated so that they change over time as new information becomes available, e.g., in the event stream or otherwise.

A detection engine (e.g., 130) may compare new events generated by an entity, as recorded in the event stream, to the entity model that characterizes a baseline of expected activity. By representing the entity model and the event vectors in a common, or related, vector space, deviations from expected behavior can usefully be identified based on the vector distance between one or more event vectors and the entity model. This comparison may usefully employ a variety of vector or similarity measures known in the art. For example, the comparison may use one or more vector distances such as a Euclidean distance, a Mahalanobis distance, a Minkowski distance, or any other suitable measurement of difference within the corresponding vector space. In another aspect, a k-nearest neighbor classifier may be used to calculate a distance between a point of interest and a training data set, or more generally to determine whether an event vector 1410 should be classified as within the baseline activity characterized by the entity model.

It will be understood that, while event vectors and entity models as described herein provide one useful technique observing deviations from a baseline of expected behavior by entities within an enterprise, the detection engine may also or instead employ other detection techniques based on the event stream, e.g., to support real time detection of suspicious or malicious behavior. For example, certain events may be independently and directly indicative of malicious activity, such as initiating communications with a known command and control center for an advanced persistent threat. Other events may be potentially indicative of malicious activity, such as initiating disk-wide encryption or transmitting sensitive information from an endpoint. While tools exist for detecting these types of malicious activity, relevant events may be present in the event stream, and the response facility may usefully trigger additional analysis, investigation, or other responses based on the event stream instead of or in addition to monitoring for deviations from entity baselines. In another aspect, concurrent deviations by different entities, or a pattern of deviations for a single entity or among entities, may also be usefully monitored. For example, a deviation in the behavior of a trusted application across multiple compute instances, either concurrently or in succession, may indicate a rollout of a software update rather than malicious behavior. Conversely, if a number of compute instances concurrently begin contacting an unknown network address, this may be an indication of malware propagating among devices in an enterprise network. More generally, deviations among different entities, or among multiple instances of a particular entity, may provide useful information about actual or potential causes of the change, and may inform subsequent manual or automated investigations.

In general, where the event stream deviates from a baseline of expected activity that is described in the entity models for one or more entities, any number of responses may be initiated by the response facility of the threat management facility. In one aspect, this may include deployment of known remediations for malicious activity such as quarantine, termination of network communications, termination of processes or applications, an increase in local monitoring activity on affected compute instances, messages to a network administrator, filtering of network activity, antivirus scans, deployment of security patches or fixes, and so forth. This may also in policy updates. For example, security policies for compute instances, users, applications or the like may be updated to security settings that impose stricter controls or limits on activity including, e.g., limits on network activity (bandwidth, data quotas, permitted network addresses, etc.), limits on system changes (e.g., registry entries, certain system calls, etc.), limits on file activity (e.g., changes to file permissions), increased levels of local activity monitoring, and so forth.

For example, events can include receiving from an endpoint a request to connect to a website, connecting to the website, receiving a request for a file transfer from the website, and a file transfer. The events can be analyzed in terms of actions (e.g., what requests are being generated by a specific endpoint, who is being connected to, when are connections being made, etc.) and content or signature (e.g., what data is within a request or a file or other data being transferred). Events can be collected and logged locally (e.g., at a firewall or other network device) and sent to another system (e.g., a cloud-based threat management facility) for analysis and classification. For example, a signature analysis can be performed by a machine learning (ML) model to detect, classify, and/or characterize events. In another example, a compressed file (e.g., a zip file) containing hidden text can be analyzed. Other examples of content analysis include analyzing uniform resource locators (URLs) and registry keys.

In some implementations, the endpoint device 302 can perform one or more security tasks. The tag information can indicate to the network device 306 that the endpoint device 302 has performed one or more security tasks on the traffic flow. The network device 306 can be configured to automatically determine any non-redundant security tasks (security tasks not performed by the endpoint) for the traffic flow and perform the non-redundant security tasks.

In some implementations, the endpoint device and the network device can dynamically change network security roles. For example, if the endpoint device is handling security tasks subset A and the network device is handling security tasks subset B, the two devices may switch so that the endpoint device handles subset B and the network device handles subset A. This switching can occur in situations such as resource limitations occurring in the endpoint device or the network device. In another example, if the endpoint device was performing one or more security tasks and the network device was performing any non-redundant tasks, the roles could switch such that the network device performs the one or more security tasks and endpoint device performs any non-redundant security tasks.

Security task allocation and/or role (or a change of security task allocation or role) can be based on one or more of functional differences between the endpoint and the firewall. For example, the functional differences can include resource availability such as processing resources such as processor throughput and free working memory available. Functional differences can also be based on security software version and/or license provisions, which can be used to determine security task allocation or role. Security task allocation or role can also be based on policy settings. Operating system version or type can also be used to determine security task allocation or role. Security task allocation and role can also be based on one or more of known threat level, power consumption, or stored threat information.

In some implementations, the network device can instruct the endpoint device to perform additional tasks in response to one or more parameters. For example, the one or more parameters can include an indication of network device processor utilization, network device memory utilization, or traffic flow type.

In some implementations, the one or more security tasks can include a security task that can only be performed at the endpoint device or the network device. In some implementations, the one or more security tasks can include a security task that is performed on a device selected based on device role (e.g., whether the device is an endpoint or firewall, etc.).

In some implementations, the network device can be configured to make adjustments to security task allocation (i.e., the division of tasks between endpoint device and network device such as a firewall) based on one or more of a higher threat perception, a change in configuration, or one or more device-specific factors.

Figure 4:
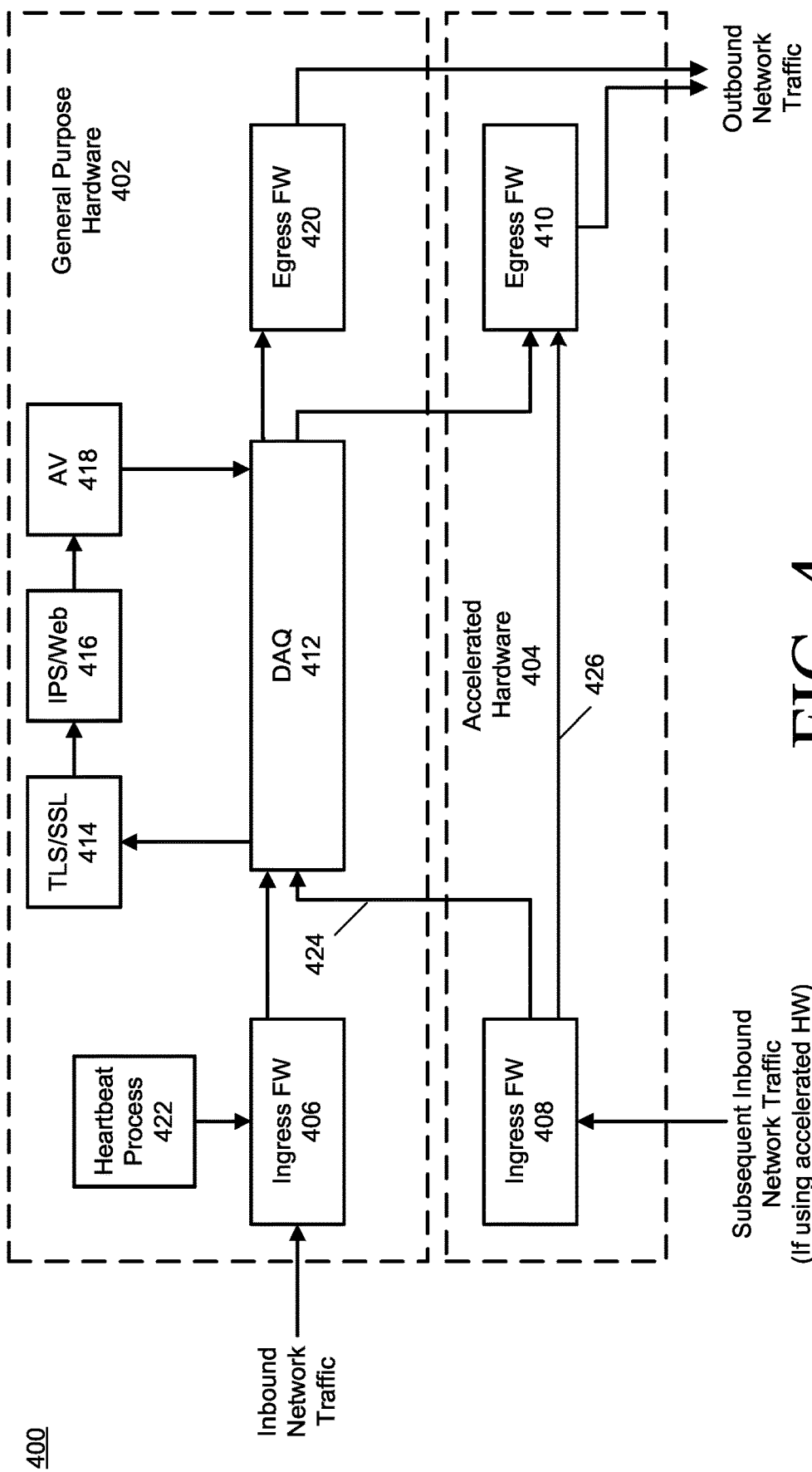
FIG. 4 is a diagram of an example firewall system including an accelerated hardware processor in accordance with some implementations.

FIG. 4 is a diagram of an example firewall 400 with a two (or more) chip solution including a general-purpose hardware processing section 402 and an accelerated hardware processing section 404. The general-purpose hardware processing section 402 can include a general-purpose processor, such as an x86 processor or the like. The accelerated processing section 404 can include a special purpose network processor engineered in hardware to process network packets (e.g., processing network traffic flow data).

The general-purpose hardware processing section 402 can include modules (including software and/or hardware) such as an ingress firewall (FW) module 406, a data acquisition module 412, a Transport Layer Security (TLS)/Secure Sockets Layer (SSL) or TLS/SSL module 414, an Intrusion Prevention System or IPS/web module 416, an antivirus (AV) module 418, and an egress firewall (FW) module 420. The ingress FW module 406 can include one or more additional functions such as denial of service (DoS) processing, virtual private network (VPN), etc. The egress FW module 420 can include one or more additional functions such as a virtual private network module (VPN) and/or a quality of service (QoS) module. The modules in the general-purpose hardware processing section 402 can include software modules that are executed on a general-purpose processor.

The accelerated hardware processing section 404 can include modules (including software and/or hardware) such as an ingress FW module 408 and an egress FW module 410. The ingress FW module 408 can include one or more additional functions such as denial of service (DoS) processing, virtual private network (VPN), etc. The egress FW module 410 can include one or more additional functions such as a virtual private network module (VPN) and/or a quality of service (QoS) module. The modules in the accelerated hardware processing section 404 can include software modules that are executed on a specialized network processor.

In operation, incoming network traffic can be received at the ingress FW 406. The ingress FW module 406 can also receive tag information from a synchronized security message (e.g., a heartbeat message) via a heartbeat process 422 that is configured to receive heartbeat messages from endpoint devices connected to the firewall 400. The heartbeat process 422 can be part of the firewall or a separate process. The first few packets (and optionally the tag information) can be analyzed by the ingress FW 406 to determine how the traffic flow will be processed (e.g., whether the traffic will be processed in the general-purpose hardware section or the accelerated hardware section and what security functions will be performed). The security tasks determined to be needed by the ingress FW 406 (or other modules such as the IPS/Web module 416 that can determine when AV processing is needed) can be performed on each packet of the traffic flow. For example, if the tag information and/or the first few packets of the traffic flow (or other information such as the current processing state of the firewall indicates that the traffic is suitable for processing through the accelerated hardware section, the ingress FW 406 in the general purpose processing section 402 can communicate to the ingress FW 408 in the accelerated hardware processing section 404 that the subsequent packets of the traffic flow will be handled in the accelerated hardware processing section 404.

It can be important to determine very early in the traffic flow processing which security tasks are needed. For example, for a TLS protocol traffic flow, the decision for a man-in-the-middle inspection needs to be made very early in the processing (e.g., at the first packet) and may not be able to be terminated until all of the packets for that traffic flow are processed. An advantage of the tag information being received at the firewall 400 prior to the arrival or initial processing of the traffic, is that the firewall 400 may use the tag information to help determine how to process the traffic flow before processing of the traffic flow itself begins.

For a network traffic flow for which security policy directs that TLS/SSL, IPS/Web, or AV processing is to be performed, the network traffic flow can be received by the data acquisition (DAQ) section 412 and provided to one or more of the TLS/SSL module 414, the IPS/Web module 416, or the AV module 418. While FIG. 4 shows a data flow path from the DAQ module 412 to the TLS/SSL 414, to the IPS/Web 416, to the AV module 418, and in turn back to the DAQ 412 for output to one of the egress FW modules (420 or 410), this scenario is for illustration purposes only. The DAQ module 412 can send traffic flow data to one or more of the TLS/SSL module 414, the IPS/Web module 416, or the AV module 418 individually or in a sequence different than that shown in FIG. 4.

In operation, when processing a traffic flow, when the firewall 400 can keep traffic flow processing in the accelerated hardware section 404 (e.g., in path 426) and not have to move processing to the software section 403 (e.g., via path 424), the traffic flow can typically be processed more quickly, with less latency, and with less burden on the processor executing the instructions for the general purpose hardware processing section 402. An advantage of the disclosed methods and systems it that traffic flow security tasks can be allocated and coordinated between an endpoint device and a network device such as a firewall so that the firewall can perform as much of its processing as possibly in the hardware section and the endpoint device, if capable can perform security task processing that permits the firewall to use only the hardware section for performing any remaining non-redundant security tasks.

For example, if the endpoint device is running a threat management component, which is in communication with a threat management system (e.g., via a heartbeat message received by 422), then the firewall 306 may skip the anti-virus scan (performed at FIG. 4, AV 418). This can help the firewall 400 process the traffic flow in the accelerated hardware section 404 to the extent possible and reduce processing performed in the general purpose hardware section 402, which may be slower than the accelerated hardware processing section 404.

In another example, if the process associated with a traffic flow has a reputation score that meets a threshold value, then the firewall can skip the intrusion protection system (IPS) (performed by IPS/Web module 416) for that traffic flow and help keep the flow in the accelerated hardware processing section 404.

In another example, if the endpoint device is able to send the tag information to the firewall 400 within a threshold amount of time (e.g., within less than a maximum latency time, etc.), the firewall can potentially skip the TLS/SSL processing performed by TLS/SSL module 414.

In some implementations, the firewall 400 can identify, via the tag information, which security tasks the endpoint device is capable of performing (or is performing) and can then select a subset of non-redundant security tasks to perform at the firewall 400 so that the firewall 400 traffic flow processing can be performed in the accelerated hardware section 404 as much as possible.

In some implementations, it may be advantageous for the firewall 400 to receive the tag information prior to receiving any portion of the traffic flow so that the firewall 400 can determine whether certain traffic flows meet one or more criteria for execution of the security tasks, e.g., when flows have certain characteristics such as origin IP, port, protocols used, etc. that are triggers for these tasks. For example, certain decryption techniques (e.g., TLS 1.3) may require that a traffic flow being completely decrypted once decryption has started. Accordingly, if the firewall can avoid starting the decryption process, for example by receiving tag information from an endpoint device that decryption is not necessary, then a need to perform the decryption process may be reduced or able to be avoided entirely and processer and/or memory resources utilized for processing the traffic flow may be reduced in comparison to when the decryption process is performed in full.

A level of security may be used to determine security task allocation. For example, a firewall 400 may determine that more than a threshold number of devices are connected to the firewall and may increase the level of security based on the number of endpoint devices connected to the firewall. Also, the security task allocation can be determined based on which device is able to best provide security. For example, IPS on an endpoint may be applied to an entire file. The endpoint device may have process context information and data content information, which can be used in security tasks and which may not be available to the firewall or other network devices. Thus, certain security tasks (e.g., those that may benefit from the data content or process context) may be performed on the endpoint device.

Figure 5:
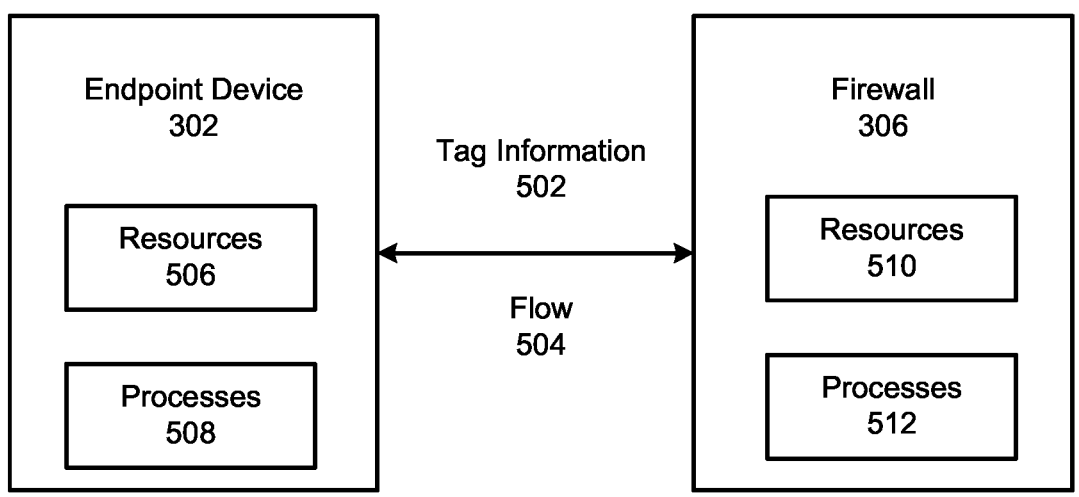
FIG. 5 is a diagram showing traffic flow and tag information exchanged between an endpoint device and a firewall in accordance with some implementations.

FIG. 5 is a diagram showing traffic flow 504 and tag information 502 exchanged between the endpoint device 302 and the firewall 306. The tag information 502 can be sent from the endpoint device 302 to the network device 306 or vice versa in order to allocate and coordinate security task processing between the endpoint device 302 and the network device 306.

In some implementations, the tag information 502 can be determined based on one or more of: identity information of a process (e.g., 508) executing on the endpoint device 302 that generates the traffic flow, dynamic information of the process, resources available on the endpoint device (506), or one or more actions performed by the endpoint device 302. In some implementations, the one or more actions can include a security action, and the at least one security task that is excluded by the network device 306 is duplicative of the security action performed by the endpoint device 302. For tag information sent from the firewall 306 to the endpoint 302, the tag information can be based on firewall resources 510 or processes 512.

In some implementations, the tag information can be analyzed by the receiving device (e.g., the network device or the endpoint device that will be receiving the traffic flow following processing of the tag information) to determine characteristics of the traffic flow before the traffic flow is received. Characteristics of the traffic flow can include patterns and/or aggregation of information about the source and or destination of the traffic flow. For example, some non-threat applications may have a known pattern of trying to circumvent or go around a firewall. The characteristic of the source of the traffic flow can inform the firewall or threat management facility about how to handle the traffic flow. In some implementations, receiving the tag information can include receiving an in-band message from the endpoint device. For example, the in-band message can be included in a first packet of the traffic flow or can be received prior to receipt of the first packet of the traffic flow. An in-band message is a message (e.g., a network management message) that is carried through the network itself. In contrast, an out of band message is one that is sent or received via a dedicated channel that can be independent of the network.

In some implementations, transmitting and receiving the tag information includes an out-of-band message, wherein the out-of-band message is distinct from the traffic flow. The out of band message can be an asynchronous out of band message or a synchronous out of band message. In some implementations, the synchronous out of band message can include a heartbeat message used between devices that are registered with a synchronized security system (e.g., a of a cloud-based threat management system). In some implementations, the out of band message is sent so quickly that a pre-connection information cache or buffer may be needed to hold the out of band message while the firewall or other network device awaits the connection. When a connection is received, the firewall or other network device, can match the new connection with the tag information in the previously received out of band message stored in the pre-connection cache.

Some implementations can include sending a confirmation to the endpoint device that the out-of-band message was received, wherein further packets of the traffic flow are only transmitted by the endpoint and received by the network device after sending the confirmation.

In some implementations, the network device 306 is a firewall device that includes a hardware accelerator (e.g., the hardware processing modules 401 shown in FIG. 4). In some implementations, at least one task of the subset of the plurality of security tasks is performed by the hardware accelerator. In some implementations, determining the subset of the plurality of security tasks includes determining a level of security based on the tag information, wherein tasks in the subset of the plurality of security tasks correspond to the level of security.

In some implementations, the tag information is received as part of a synchronized security message from the endpoint device to the network device. In some implementations, selecting the subset of the plurality of security tasks is based on one or more network device settings.

Figure 6:
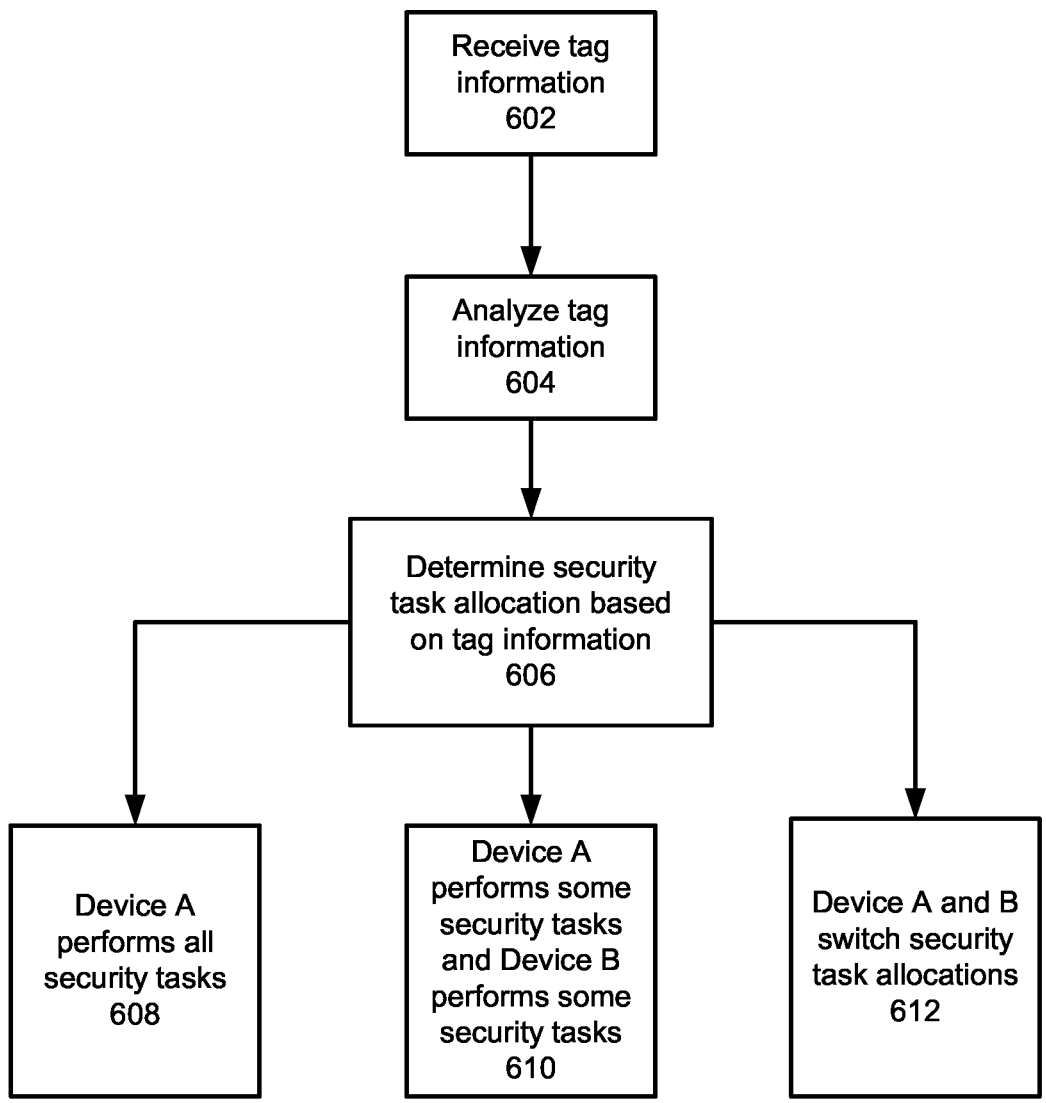
FIG. 6 is a flowchart showing an example method of security task allocation between an endpoint device and a network device in accordance with some implementations.

FIG. 6 is a flowchart showing an example method of security task allocation/coordination between two devices (e.g., an endpoint device and a network device). Because the two devices can switch roles as described below, the method of FIG. 6 is applicable to either the endpoint or the firewall. Accordingly, FIG. 6 uses generic labels of devices A and B, which could both either be an endpoint or firewall. Processing begins at 602, where tag information is received (e.g., at device A). Processing continues to 604.

At 604, the tag information is analyzed. For example, the receiving device could analyze the tag information to determine what security tasks may have been performed by the transmitting device, or may analyze the tag information to determine available security task processing resources at the transmitting device or process reputation information of a process associated with a traffic flow corresponding to the tag information. A conclusion of the tag information analysis can be which security tasks may need to be performed and/or what resources are available at the transmitting device to perform security tasks. Processing continues to 606.

At 606, a security task allocation is determined based on the analysis of the tag information. For example, using the result of the tag information analysis reached in step 604, an allocation can be made about which of the security tasks to perform on which devices (e.g., on the transmitting device and the receiving device). For example, the security task allocation can include one of three possibilities: device A performs all tasks, device B performs some tasks, or devices A and B switch roles. Based on the security task allocation, processing can continue to 608, 610, or 612.

At 608, device A performs all security tasks. For example, if the tag information analysis conclusion is that device A has the resources available to perform the security tasks and device B does not, then the allocation would be that device A performs all security tasks.

At 610, device A performs some security tasks and device B performs some security tasks. For example, if both devices A and B have resources available to perform security task processing, then the security tasks may be allocated to both devices.

At 612, devices A and B switch security task allocations. For example, if device A was performing all security tasks and resource availability on device A changes such that device A is no longer able to perform the security tasks, then devices A and B can switch roles so that device B begins performing the security tasks. In another example, both devices A and B may be performing security tasks with device A performing a majority of the security tasks and device B performing the remaining security tasks. Resource availability on device A may change such that the allocation causes devices A and B to switch and device B to assume responsibility for performing the majority of the security tasks.

Blocks 602-612 can be repeated and the security task allocation can be updated dynamically as changes develop in the traffic flow or in one of the devices.

Figure 7:
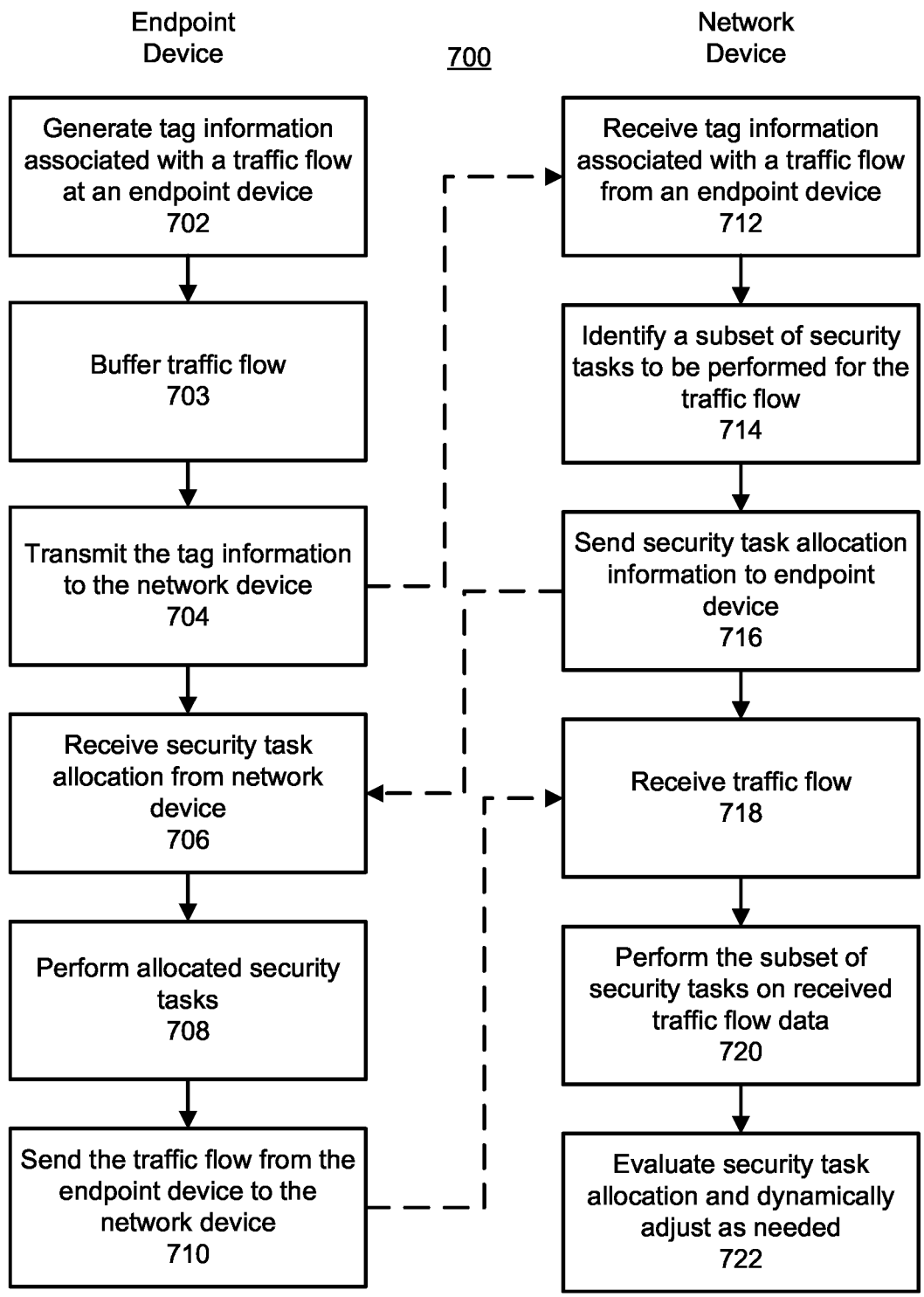
FIG. 7 is flow chart showing an example method to allocate security tasks between an endpoint device and network device in accordance with some implementations.

FIG. 7 is a flowchart showing an example method 700 (e.g., a computer-implemented method) to perform and/or allocate network security processing tasks, in accordance with some implementations.

In some implementations, method 700 can be implemented, for example, on one or more of an endpoint device or a network device such as a firewall or an access point (e.g., 304 or 306, respectively), on a threat management system (e.g., 100, 310), an enterprise facility (e.g., 102), a cloud enterprise facility 280, or other device or a combination of devices. In some implementations, some or all of method 700 can be implemented on one or more devices of 100 or 102 as shown in FIG. 1 or 280 as shown in FIG. 2, on one or more server devices, and/or on both server device(s) and client device(s). In described examples, the implementing system includes one or more digital hardware processors or processing circuitry ("processors"), and one or more storage devices. In some implementations, different components of one or more devices or facilities can perform different blocks or other parts of the method 700.

In some implementations, the method 700, or portions of the method, can be initiated automatically by a device. For example, the method (or portions thereof) can be periodically performed or performed based on the occurrence of one or more particular events or conditions. For example, such events or conditions can include an endpoint device preparing to send a network traffic flow to a firewall, a predetermined time period having expired since the last performance of method 700, and/or one or more other events or conditions occurring which can be specified in settings of a device implementing method 700. In some implementations, such conditions can be previously specified by a user in stored custom preferences of the user (accessible by a device or method with user consent). In some examples, a device (server or client) can perform the method 700 with access to one or more applications. In another example, a network device (e.g., a firewall or access point) can perform the method 700. In addition, or alternatively, a network device can send data to a server (e.g., a threat management facility) over a network, and the server can perform method 700 in whole or in part. Method 700 can also be performed using a combination of processing on an endpoint device, a network device (e.g., firewall), and/or a threat management facility. Method 700 includes two portions, an endpoint device portion (702-710) and a network device portion (712-722).

Processing begins at 702, where tag information is generated. The tag information is associated with a traffic flow and can include information can include one or more characteristics of the traffic flow. The traffic flow can include data to be sent over the network or a request for data from a resource connected to the network. The tag information can include traffic flow state information. Processing continues to 704.

At 704, the tag information is transmitted to a network device (as shown by the dashed line from 704 to 712). The tag information can be transmitted in various ways. For example, the tag information can be transmitted in an in-band message from the endpoint device. The in-band message can be included in a first packet of the traffic flow or is transmitted prior to transmission of the first packet of the traffic flow.

In some implementations, transmitting the tag information can include transmitting an out-of-band message from the endpoint device. The out-of-band message is distinct from the traffic flow. In some implementations, the tag information can be transmitted as part of a synchronized security message from the endpoint device to the network device. Processing continues to 706.

At 706, a security task allocation is optionally received from a network device. The security task allocation message can include information about which security tasks the network device is performing and which security tasks the endpoint device may need to perform. Processing continues to 708.

At 708, the endpoint device performs the security tasks according to the capabilities and/or available resources of the endpoint or according to the received security task allocation information from the network device. Processing continues to 710.

At 710, the traffic flow is sent from the endpoint device to the network device (as shown by the dashed line from 710 to 718). Processing continues to 712.

At 712, the network device receives the tag information associated with a traffic flow. Details of example tag information are described below in connection with FIG. 11. The network device can programmatically analyze the tag information. For example, if a traffic flow includes a request for data from IP address that is not known to the firewall, but the tag information includes identification of the requesting process as a trusted application (e.g., Netflix), the firewall can determine that although the IP address is not one that is known (or on a white list of IP addresses), the identification of the requesting application in the tag information can be analyzed by the firewall and the traffic request can be permitted to proceed. Processing continues to 714.

At 714, the network device identifies a subset of security tasks to be performed for the traffic flow. Continuing with the example given at step 712, based on the firewall determining that the traffic flow is associated with a known application, the firewall can perform security tasks in accordance with the policy for traffic flow associated with known applications. Also, the firewall can perform other security tasks based on the tag information. For example, firewall can record the new Netflix IP address in a data store of known IP addresses and/or inform other firewalls and/or the threat management facility about the new Netflix IP address so that future security processing will be made more efficient.

For example, if the endpoint can inform the firewall via tag information that a connection is being started and inform the firewall via the tag information that the endpoint can provide the inspection in lieu of the firewall (e.g., intrusion prevention, web scanning, anti-virus), then the entirety of the traffic flow can pass through the accelerated hardware section (e.g., 404) without violating a security policy.

In yet another example, if the firewall detects a flood of traffic coming from the endpoint and/or application, the firewall can send information back to the endpoint (e.g., via a heartbeat message) to have endpoint stop flow.

One of the factors in determining which security policies to apply is the type of application that is generating the traffic. The firewall can get the application type information via tag information from the endpoint, which can possibly do a better job of identifying the applications generating the traffic. The firewall can request from the endpoint more information about an application generating a certain type of traffic. The application information need not be requested, the endpoint can push the application information to the firewall without having a request from the firewall for the application information.

In determining the allocation or roles for security task processing, the firewall or other network device can evaluate one or more of: the traffic and load on the firewall, network device, or network (e.g., LAN, WiFi, or Internet connection), the capabilities of the network security software associated with the threat management facility or other security software, what a device is currently doing, what a device is capable of doing, a security posture (e.g., applications, capabilities, and/or vulnerabilities of the current situation), security policies (e.g., such as a preferred allocation that may take precedence over an allocation indicated by other factors), or cost (e.g., a reallocation of tasks may be able to reduce a number of firewall instances running, etc.). Processing continues to 716.

At 716, security task allocation information is optionally sent to the endpoint device (as shown by the dashed line from 716 to 706). The security task allocation information sent to the endpoint device can let the endpoint device know which security tasks are being performed by the firewall (or other network device) and which security devices need to be performed by the endpoint device. Processing continues to 718.

At 718, the traffic flow is received from the endpoint device. Processing continues to 720.

At 720, the network device performs the subset of security tasks. In some implementations, an endpoint may have more visibility as to a user and/or process that initiated the connection. In an example endpoint-firewall coordination scenario, an endpoint may be able to indicate via tag information that antivirus scanning for a traffic flow can be performed at the endpoint, but not TLS or web processing. Accordingly, the traffic flow may still need to be inspected in the firewall (e.g., in the TLS/SSL module 414 or AV module 418).

In another example, the firewall may be able to skip DoS protections based on tag information that the firewall can trust the traffic flow is not malicious (e.g., because endpoint is doing sufficient DoS checking and communicates this in the tag information).

Processing continues to 722.

At 722, the security task allocation is evaluated and dynamically adjusted as needed. For example, the security task allocation between the network device and the endpoint device can be evaluated and dynamically adjusted based on changes in the traffic flow, resource utilization at the endpoint device or network device, etc.

One or more of blocks 702-722 may be repeated, performed in a different order or performed periodically.

Figure 8:
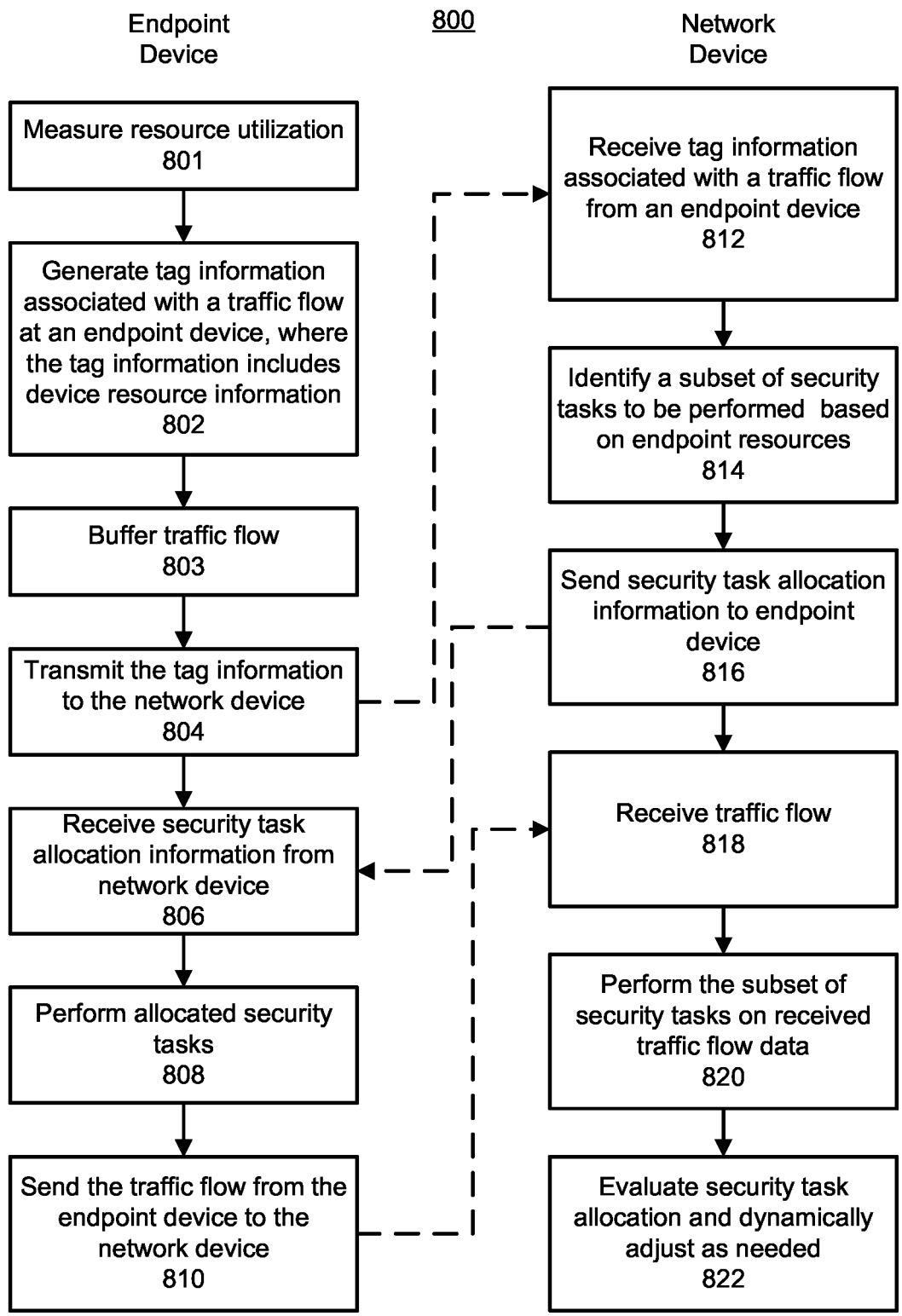
FIG. 8 is flow chart showing an example method to allocate security tasks between an endpoint device and network device in accordance with some implementations.

FIG. 8 is a flowchart showing an example method 800 (e.g., a computer-implemented method) to perform and/or allocate network security processing tasks, in accordance with some implementations.

In some implementations, method 800 can be implemented, for example, on one or more of an endpoint device or a network device such as a firewall or an access point (e.g., 304 or 306, respectively), on a threat management system (e.g., 100, 310), an enterprise facility (e.g., 102), a cloud enterprise facility 280, or other device or a combination of devices. In some implementations, some or all of method 800 can be implemented on one or more devices of 100 or 102 as shown in FIG. 1 or 280 as shown in FIG. 2, on one or more server devices, and/or on both server device(s) and client device(s). In described examples, the implementing system includes one or more digital hardware processors or processing circuitry ("processors"), and one or more storage devices. In some implementations, different components of one or more devices or facilities can perform different blocks or other parts of the method 800.

In some implementations, the method 800, or portions of the method, can be initiated automatically by a device. For example, the method (or portions thereof) can be periodically performed or performed based on the occurrence of one or more particular events or conditions. For example, such events or conditions can include an endpoint device preparing to send a network traffic flow to a firewall, a predetermined time period having expired since the last performance of method 800, and/or one or more other events or conditions occurring which can be specified in settings of a device implementing method 800. In some implementations, such conditions can be previously specified by a user in stored custom preferences of the user (accessible by a device or method with user consent). In some examples, a device (server or client) can perform the method 800 with access to one or more applications. In another example, a network device (e.g., a firewall or access point) can perform the method 800. In addition, or alternatively, a network device can send data to a server (e.g., a threat management facility) over a network, and the server can perform method 800 in whole or in part. Method 800 can also be performed using a combination of processing on an endpoint device, a network device (e.g., firewall), and/or a threat management facility. Method 800 includes two portions, an endpoint device portion (802-810) and a network device portion (812-822).

Processing begins at 801, where resource utilization is measured. For example, measuring resource utilization can include requesting utilization from the endpoint and/or the firewall. Resource utilization can include available memory and available processor throughput. Resource utilization can also include information indicative of capabilities such as software versions and/or license types, or operating system type or version. Processing continues to 802.

At 802, tag information is generated. In some implementations, the tag information can include endpoint device resource information. In some implementations, the tag information can include associating static information about endpoint resources with the traffic flow prior to sending the traffic flow to the network device, or associating dynamic information about endpoint resources (e.g., processor utilization, memory utilization, processing resources available, memory resources available, network bandwidth utilization, software version or license, operating system type or version, etc.) with the traffic flow prior to sending the traffic flow to the network device. The dynamic information can include user state information. The traffic flow can include data to be sent over the network or a request for data from a resource connected to the network. Processing continues to 804.

At 804, the tag information is transmitted to a network device (as shown by the dashed line from 804 to 812). The tag information can be transmitted in various ways. For example, the tag information can be transmitted in an in-band message from the endpoint device. The in-band message can be included in a first packet of the traffic flow or is transmitted prior to transmission of the first packet of the traffic flow.

In some implementations, transmitting the tag information can include transmitting an out-of-band message from the endpoint device. The out-of-band message is distinct from the traffic flow. In some implementations, the tag information can be transmitted as part of a synchronized security message from the endpoint device to the network device. Processing continues to 806.

At 806, a security task allocation is optionally received from a network device. The security task allocation message can include information about which security tasks the network device is performing and which security tasks the endpoint device may need to perform. Processing continues to 808.

At 808, the endpoint device performs the security tasks according to the capabilities and/or available resources of the endpoint or according to the received security task allocation information from the network device. Processing continues to 810.

At 810, the traffic flow is sent from the endpoint device to the network device (as shown by the dashed line from 810 to 818).

At 812, the network device receives the tag information associated with a traffic flow. The network device can programmatically analyze the tag information. Processing continues to 814.

At 814, the network device identifies a subset of security tasks to be performed for the traffic flow. Processing continues to 816.

At 816, security task allocation information is optionally sent to the endpoint device (as shown by the dashed line from 816 to 806). The security task allocation information sent to the endpoint device can let the endpoint device know which security tasks are being performed by the firewall (or other network device) and which security devices need to be performed by the endpoint device. Processing continues to 818.

At 818, the traffic flow is received from the endpoint device. Processing continues to 820.

At 820, the network device performs the subset of security tasks. Processing continues to 822.

At 822, the security task allocation is evaluated and dynamically adjusted as needed. For example, the security task allocation between the network device and the endpoint device can be evaluated and dynamically adjusted based on changes in the traffic flow, resource utilization at the endpoint device or network device, etc.

One or more of blocks 801-822 may be repeated, performed in a different order or performed periodically.

Figure 9:
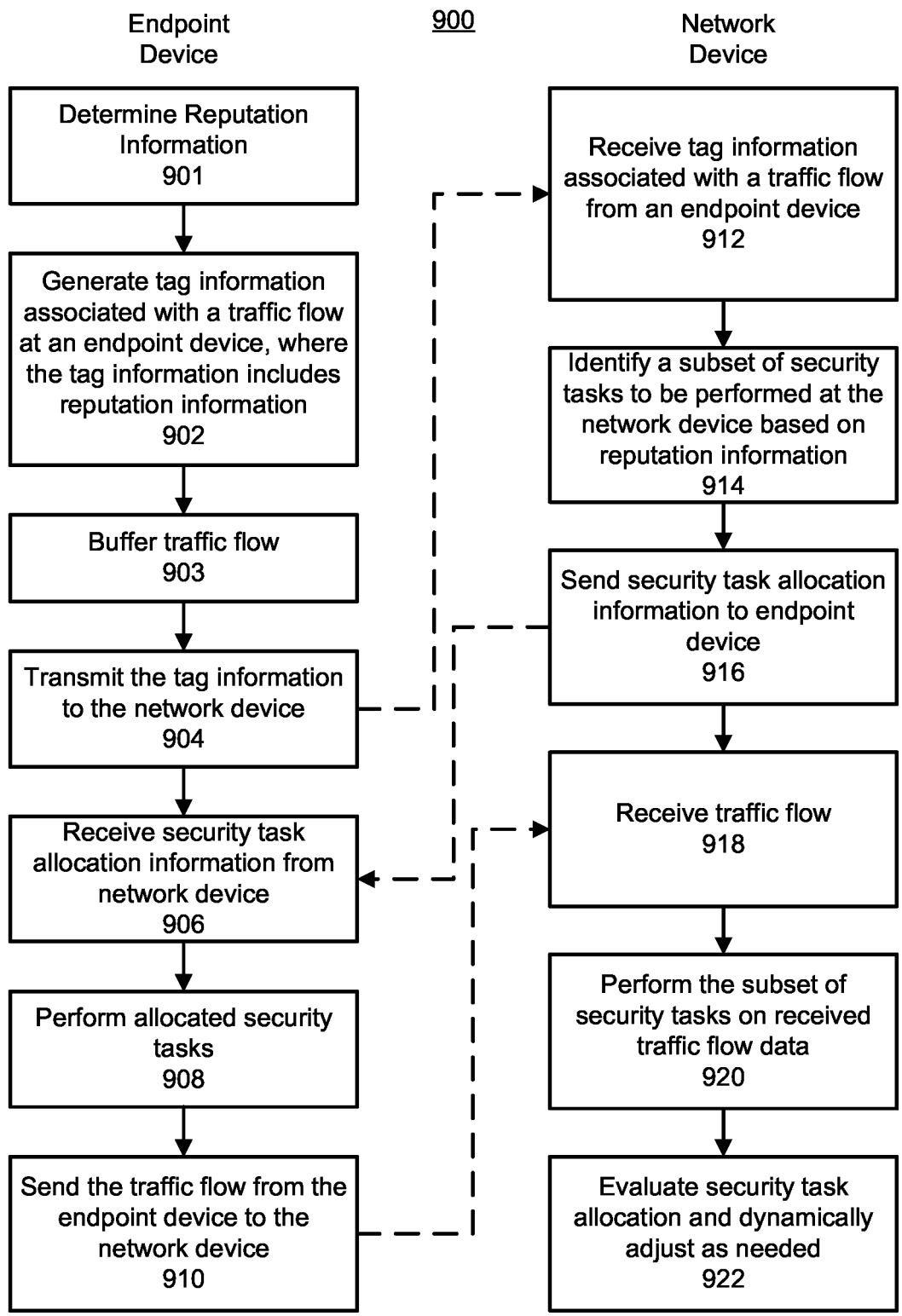
FIG. 9 is flow chart showing an example method to allocate security tasks between an endpoint device and network device in accordance with some implementations.

FIG. 9 is a flowchart showing an example method 900 (e.g., a computer-implemented method) to perform and/or allocate network security processing tasks, in accordance with some implementations.

In some implementations, method 900 can be implemented, for example, on one or more of an endpoint device or a network device such as a firewall or an access point (e.g., 304 or 306, respectively), on a threat management system (e.g., 100, 310), an enterprise facility (e.g., 102), a cloud enterprise facility 280, or other device or a combination of devices. In some implementations, some or all of method 900 can be implemented on one or more devices of 100 or 102 as shown in FIG. 1 or 280 as shown in FIG. 2, on one or more server devices, and/or on both server device(s) and client device(s). In described examples, the implementing system includes one or more digital hardware processors or processing circuitry ("processors"), and one or more storage devices. In some implementations, different components of one or more devices or facilities can perform different blocks or other parts of the method 900.

In some implementations, the method 900, or portions of the method, can be initiated automatically by a device. For example, the method (or portions thereof) can be periodically performed or performed based on the occurrence of one or more particular events or conditions. For example, such events or conditions can include an endpoint device preparing to send a network traffic flow to a firewall, a predetermined time period having expired since the last performance of method 900, and/or one or more other events or conditions occurring which can be specified in settings of a device implementing method 900. In some implementations, such conditions can be previously specified by a user in stored custom preferences of the user (accessible by a device or method with user consent). In some examples, a device (server or client) can perform the method 900 with access to one or more applications. In another example, a network device (e.g., a firewall or access point) can perform the method 900. In addition, or alternatively, a network device can send data to a server (e.g., a threat management facility) over a network, and the server can perform method 900 in whole or in part. Method 900 can also be performed using a combination of processing on an endpoint device, a network device (e.g., firewall), and/or a threat management facility. Method 900 includes two portions, an endpoint device portion (902-910) and a network device portion (912-922).

Processing begins at 901, where reputation information about a user account and/or process associated with a traffic flow is determined. In some implementations, the reputation information can include a reputation score. The reputation score can be a value that represents a weighted or unweighted aggregation of values representing reputation factors. The reputation information can include a local reputation and/or a global reputation.

The reputation factors can include factors that can be determined at the firewall such as the SNI of the traffic, the IP address of the traffic flow, or the signing of the traffic. The reputation factors can also include reputation factors that can be determined at the endpoint such as information about the process on the endpoint associated with the traffic. The information about the process can include the process name, process executable file path, the local reputation of the process (e.g., how the process appears on the endpoint system), when the executable file was written to disk, what process wrote the executable file (e.g., did an internet browser write the executable file or was the file written by a Microsoft installer), etc. The reputation factors can also include a global reputation, which can include information known at the threat management facility about the process associated with the traffic flow. The global reputation information can include information aggregated from one or more traffic flows previously processed by a device connected to the threat management facility. The global reputation factors can include items such as how many times the process file has been observed by the threat management system or devices connected to it, how long ago was the process file first detected by the threat management facility, etc. The factors can be represented by a value that represent whether the factor contributes to a better or worse reputation for the traffic flow or process associated with the traffic flow.

The reputation score can also include factors generated locally by determining the reputation (e.g., via a ML model) of assets, characteristics of assets, and/or behaviors. The global reputation can include information from a threat management facility about the executable (or other) file(s0) of a process, the signature of the process or traffic flow, or a network stream associated with the process. In some implementations, a local sensor (e.g., in the endpoint) can extract information about a process or traffic flow and send the extracted information to a threat management facility for global evaluation.

The reputation information for a device for a process can be updated based on actions or content of events associated with the process. For example, the reputation score of a process can be dynamically adjusted to lower the trustworthiness of the process if the process connects to a suspicious URL. Also, if the reputation of a process reaches a certain level indicating a very unstrustworthy process, the firewall may take over any security functions that had been allocated to the endpoint running the process. Processing continues to 902.

At 902, tag information is generated. In some implementations, the tag information can include one or more of process reputation information about a process associated with the traffic flow, a process context of the process, or a data context of data within the traffic flow. The process reputation information can include indications as to whether a process controlling the traffic flow is a well-signed process and whether any network request is a well-formed network request. In some implementations, it is the endpoint software that is generating the traffic (e.g., a video stream, an audio stream, a file stream, an IoT data stream, etc.). The traffic flow can include data to be sent over the network or a request for data from a resource connected to the network. Processing continues to 904.

At 904, the tag information is transmitted to a network device (as shown by the dashed line from 904 to 912). The tag information can be transmitted in various ways. For example, the tag information can be transmitted in an in-band message from the endpoint device. The in-band message can be included in a first packet of the traffic flow or is transmitted prior to transmission of the first packet of the traffic flow.

In some implementations, transmitting the tag information can include transmitting an out-of-band message from the endpoint device. The out-of-band message is distinct from the traffic flow. In some implementations, the tag information can be transmitted as part of a synchronized security message from the endpoint device to the network device. Processing continues to 906.

At 906, a security task allocation is optionally received from a network device. The security task allocation message can include information about which security tasks the network device is performing and which security tasks the endpoint device may need to perform. Processing continues to 908.

At 908, the endpoint device performs the security tasks according to the capabilities and/or available resources of the endpoint or according to the received security task allocation information from the network device. Processing continues to 910.

At 910, the traffic flow is sent from the endpoint device to the network device (as shown by the dashed line from 910 to 918).

At 912, the network device receives the tag information associated with a traffic flow. The network device can programmatically analyze the tag information. Processing continues to 914.

At 914, the network device identifies a subset of security tasks to be performed for the traffic flow. Processing continues to 916.

At 916, security task allocation information is optionally sent to the endpoint device (as shown by the dashed line from 916 to 906). The security task allocation information sent to the endpoint device can let the endpoint device know which security tasks are being performed by the firewall (or other network device) and which security devices need to be performed by the endpoint device. Processing continues to 918.

At 918, the traffic flow is received from the endpoint device. Processing continues to 920.

At 920, the network device performs the subset of security tasks. Processing continues to 922.

At 922, the security task allocation is evaluated and dynamically adjusted as needed. For example, the security task allocation between the network device and the endpoint device can be evaluated and dynamically adjusted based on changes in the traffic flow, resource utilization at the endpoint device or network device, etc.

One or more of blocks 901-922 may be repeated, performed in a different order or performed periodically.

It should be noted that there may be a lot of information collected about compute instances and users, and this may have privacy implications and scalability implications. Privacy may be addressed in some cases by user notifications and permissions, anonymization, tokenization, and encryption. It may also be useful to optimize the network data being collected or analyzed by one or more of coalescing the data, compressing the data, or serializing the data. Security features may be used to avoid abuse of APIs (e.g., authentication, replay protection, DoS protection). Performance optimizations, such as rate limiting, prioritization, and queue management may be used to improve scalability.

Figure 10:
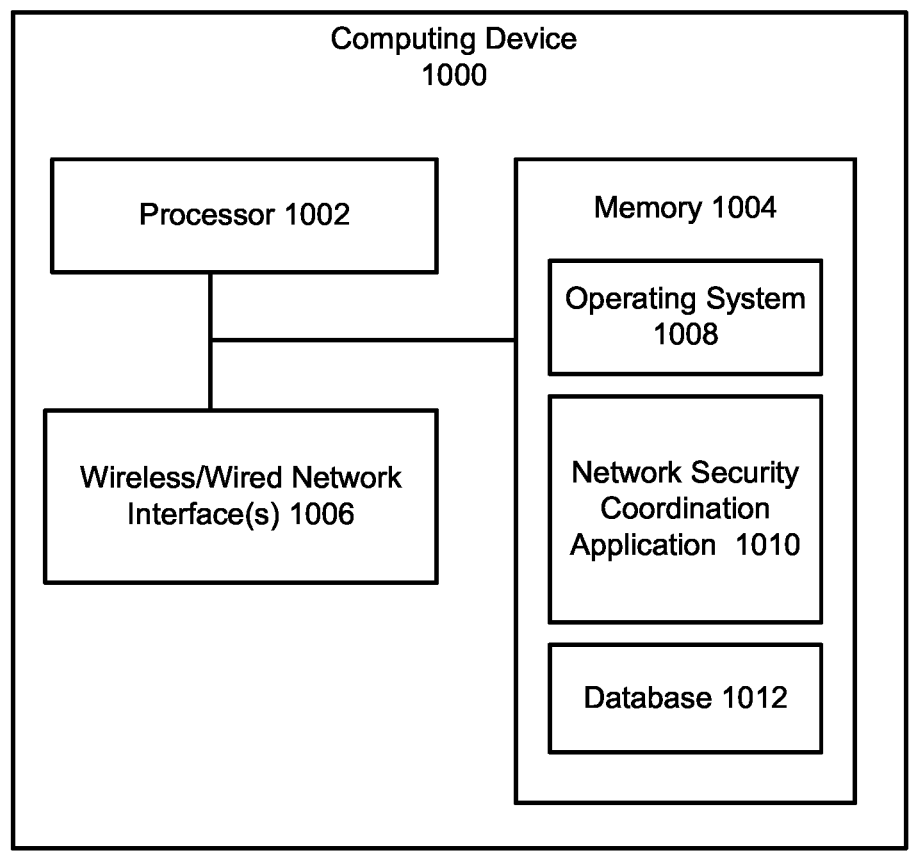
FIG. 10 is a diagram of an example computing device configured for network security in accordance with at least one implementation.

FIG. 10 is a diagram of an example computing device 1000 in accordance with at least one implementation. The computing device 1000 includes one or more processors 1002, nontransitory computer readable medium or memory 1004, and I/O interface devices 1006 (e.g., wireless communications interface, etc., all of which may be operatively coupled to each other by a bus. The computer readable medium 1004 may have stored thereon an operating system 1008, a rogue device detection application 1010 for rogue device detection, and a database 1012 (e.g., for storing device information (e.g., device type, operating system, version number, etc.), baseline pattern data, received network data, list of rogue URLs, etc.).

In operation, the processor 1002 may execute the application 1010 stored in the computer readable medium 1004. The application 1010 may include software instructions that, when executed by the processor, cause the processor to perform operations for rogue device detection in accordance with the present disclosure (e.g., performing one or more of the operations described with reference to FIG. 6, 7, 8, or 9).

The application program 1010 may operate in conjunction with the database 1012 and the operating system 1008. The device 1000 may communicate with other devices (e.g., an endpoint device, a firewall, a wireless access point, or a threat management system) via the I/O interfaces 1006.

Figure 11:
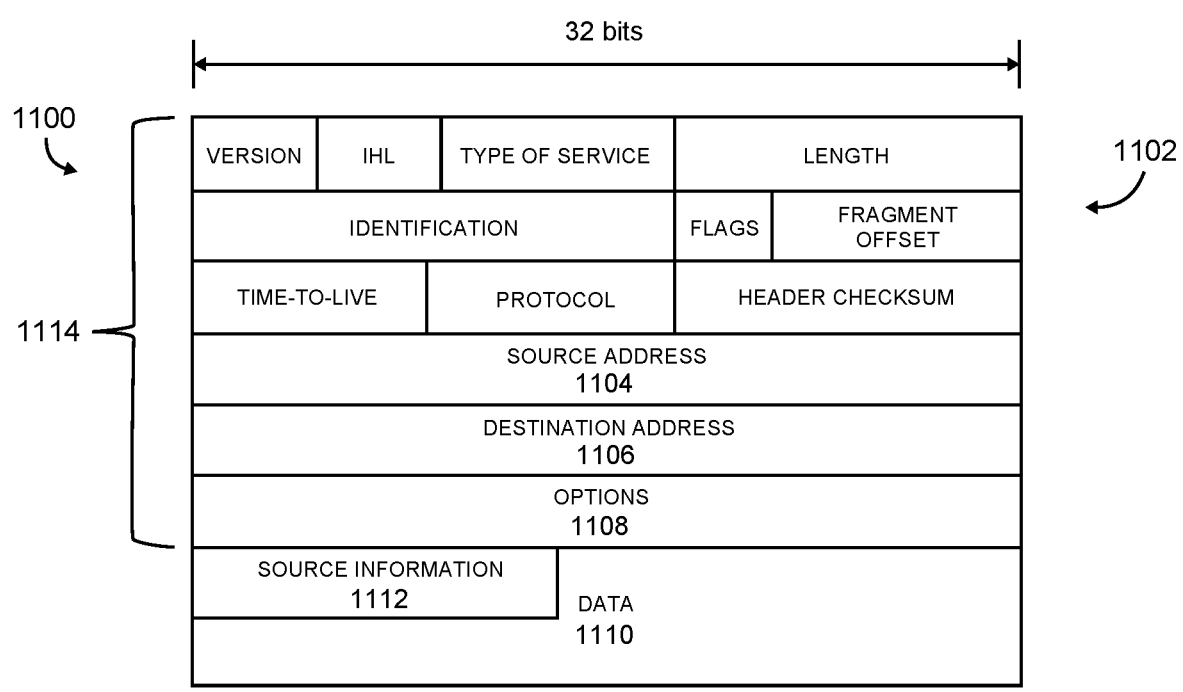
FIG. 11 is a diagram of an example network packet in accordance with some implementations.

FIG. 11 is a diagram of an example network packet 1100 (e.g., a packet in Internet Protocol (IP) packet format). In general, the packet 1100 may include preamble information 1102, a source address 1104, a destination address 1106, option information 1108, and a payload of data 1110. As described herein, the source address 1104 may generally specify a network location that originated the packet 1100, but may not provide further specific information about a source user, a source machine, a source application, or other information as contemplated herein.

In one aspect, this information may be usefully added to the packet 1100 by inserting relevant information as tag information into the option information 1108, or in any other suitable location within the packet 1100 or packet header. For example, the Internet Protocol version '4' (IPv4) packet may be configured such that additional information (e.g., tag information) may be included in the packet header, which may be specified by the internet header length (IHL) data and an option type field. This field is identified in FIG. 11 as option information 1108. In ordinary use, the option type field is sub-divided into a one-bit copied flag, a two-bit class field, and a five-bit option number. These taken together form an eight-bit value for the option type field. In one aspect, this field may be used to specify additional source information, or to identify a link or pointer to a location where such information can be obtained. For example, up to 60 bytes of optional, additional data may be included in the header, and a label may be included in this additional data. For example, where the packet is used within an enterprise domain, a portion of the header may be used by any source-aware networking components to identify a source, provide tag information, or to provide a pointer to source information which may, for example, be within the data 1110 of the packet 1100, within a separate packet, or stored at a network-accessible location such as a gateway, firewall, or threat management facility. An internet protocol version '6' (IPv6) packet may include a 20-bit flow label field, as well as the availability to provide extension headers to indicate optional information. For example, the flow label (or tag) field may be used to include a 20-bit label (or tag). For example, a 'Destination Options' extension header may be used to include label information that is not required to be examined by intermediate networking devices, but may be examined by a gateway or a final destination.

In one aspect, the option information 1108 of an IPv4 packet may be used to designate the packet as containing source information 1112 within the data 1110 of the packet 1100. Thus, for example, the first byte or bytes of the data 1110 may be used to specify source information at any desired level of granularity including a user, a machine, an application, a process, and so forth, as well as combinations of these. The source information 1112 within the data 1110 may also or instead provide a link to a resource within the enterprise network where source information for the packet 1100 can be retrieved. It will be understood that source information, whether stored within source information 1112 in the packet 1100, within the option information 1108 in the packet header 1114, or stored in some remote resource, may in general be encrypted to secure source information against unauthorized access, and/or the source information may be digitally signed to permit verification of authenticity with reference to a trusted third party or internal trust authority.

In one aspect, source information 1112 may include a reference to a process or other context information for an endpoint. The endpoint may communicate context information to a network device through a separate channel, for example using a heartbeat channel (see, e.g., FIG. 4). The context information may be stored on the endpoint, and the source information 1112 in the packet 1102 may include a reference to the context information. Thus, context information may be provided via a first channel, and a reference to the context information may be provided in a packet label. For example, each process on an endpoint may be assigned an identifier, and the identifier communicated to the network device with the operating system process information when the process is detected. The identifier may be included in the label. In this way, machine-specific information may not be included in the packet, but only a reference to the information. In some implementations, the identifier is changed periodically.

A flag within the packet header 1114 may also or instead be used to identify when (and where) source labeling information is present for a packet 1100.

In one aspect, the packet 1100 may be configured to be compatible with other IP network traffic, so that packets can move into and out of the enterprise network without additional handling, such as by inserting source information 1112 into the data 1110 of the packet payload as illustrated in FIG. 11. In another aspect, packets may be processed at the perimeter of the enterprise network, e.g., at a VPN gateway, enterprise network gateway, or any other perimeter network device, or other suitable router, switch, or other network device inside the enterprise network, with non-IP compliant packet data and/or structures being removed for outbound traffic, and where possible or applicable, reinserted for inbound traffic. In another aspect, traffic from outside the enterprise network may use a predetermined flag or the like to indicate that a packet contains source information compliant with a format for source information used within the enterprise network. More generally, any suitable techniques may be used to permit communication of source context information with network traffic within a network, while ensuring compatibility with an external network architecture such as TCP/IP or the like, and all such techniques that would be apparent to one of ordinary skill in the art are intended to fall within the scope of this disclosure.

The tag information can be based on a table maintained at the endpoint that includes information about the various processes running on the endpoint. The endpoint device can make updates to the table periodically or as processes or information about processes changes. The endpoint can send table updates to the firewall, which can maintain a table including the processes of one or more endpoints connected to the firewall. The endpoint can send process information to the firewall based on a request from the firewall. The endpoint can use process information from the table to include in tag information sent to the firewall. The endpoint can "push" the process table information to the firewall without the firewall requesting the information.

The tag information can include a user or user account identification, a machine name of the endpoint device, a process identifier, a file path of the process executable file, application identity information, local reputation information, or global reputation information.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C #.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for implementations above may be distributed across multiple computers or systems or may be co-located in a single processor or system. Example structural implementation alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Implementations of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement implementations of the method, system, or a computer program product (software program stored on a nontransitory computer readable medium).

Furthermore, implementations of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, implementations of the disclosed method, system, and computer program product may be implemented partially or fully in hardware using, for example, standard logic circuits or a VLSI design. Other hardware or software may be used to implement implementations depending on the speed and/or efficiency requirements of the systems, the particular function, and/or particular software or hardware system, microprocessor, or microcomputer being utilized. Implementations of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, implementations of the disclosed method, system, and computer readable media (or computer program product) may be implemented in software executed on a programmed general-purpose computer, a special purpose computer, a microprocessor, a network server or switch, or the like.

It is, therefore, apparent that there is provided, in accordance with the various implementations disclosed herein, methods, systems and computer readable media for detecting rogue devices.

While the disclosed subject matter has been described in conjunction with a number of implementations, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the terms "and" or "or" should generally be understood to mean "and/or" and so forth.

What is claimed is:

1. A computer-implemented method comprising:
communicating tag information between a first device and a second device coupled to the first device via a network, the second device configured to perform a plurality of security tasks, wherein the tag information is about traffic flow between the first device and the second device over the network;
identifying, by the second device, a subset of the plurality of security tasks to be performed by the second device for the traffic flow, based at least in part on the tag information, wherein the second device includes a hardware accelerator, and wherein identifying the subset of the plurality of security tasks includes:
determining that the subset of the plurality of security tasks are capable of being performed by the hardware accelerator,
determining that at least one security task is not to be performed by the hardware accelerator, and
excluding the at least one security task from the subset; and
performing for the traffic flow, by the second device, each task in the subset of the plurality of security tasks, wherein performing each task in the subset of the plurality of security tasks includes performing one or more tasks of the subset of the plurality of security tasks by the hardware accelerator.

2. The computer-implemented method of claim 1, wherein the first device is an endpoint device and the second device is a network device.

3. The computer-implemented method of claim 1, wherein the tag information includes resource information for the first device or the second device, wherein the resource information includes information about resources of the first device, wherein the resource information indicates one or more of: processor utilization of one or more processors of the first device, memory utilization at the first device, processing resources available at the first device, memory resources available at the first device, or network bandwidth utilization at the first device.

4. The computer-implemented method of claim 1, further comprising:
sending, from the second device to the first device, an indication of the at least one security task that is excluded from the subset; and
after sending the indication, receiving the traffic flow by the second device from the first device.

5. The computer-implemented method of claim 4, wherein the traffic flow is buffered by the first device until the indication of the at least one security task is received from the second device.

6. The computer-implemented method of claim 1, further comprising adjusting, by the second device, security task allocation of the plurality of security tasks between the first device and the second device based on one or more of: threat perception based on other traffic flows received by the second device, or a time since the first device or the second device joined the network.

7. The computer-implemented method of claim 1, wherein communicating the tag information includes communicating an in-band message that includes the tag information and is included in a first packet of the traffic flow or is communicated prior to communicating the first packet of the traffic flow between the first device and the second device.

8. The computer-implemented method of claim 1, wherein communicating the tag information includes communicating an out-of-band message that includes the tag information and is distinct from the traffic flow.

9. The computer-implemented method of claim 8, further comprising sending a confirmation to the first device that communicated the tag information, the confirmation confirming that the out-of-band message was received by the second device, wherein further packets of the traffic flow are received by the second device after sending the confirmation.

10. The computer-implemented method of claim 1, further comprising communicating, from the second device to the first device, instructions to the first device that instruct the first device to perform one or more additional tasks, the instructions being communicated in response to second device processor utilization or second device memory utilization.

11. The computer-implemented method of claim 1, wherein identifying the subset of the plurality of security tasks includes determining a level of security based on the tag information, wherein tasks in the subset of the plurality of security tasks correspond to the level of security, wherein determining the level of security is based on at least one of: a number of devices connected to the second device, or availability of information related to security tasks by the first device and the second device.

12. The computer-implemented method of claim 1, wherein at least one of the first device or the second device are implemented as one or more virtual machines.

13. A computer-implemented method comprising:
generating, at a first device, tag information about a traffic flow between the first device and a second device over a network, wherein the tag information includes resource information for the first device or the second device;
sending the tag information from the first device to the second device;
after sending the tag information, receiving, at the first device and from the second device, an indication of a set of security tasks to be performed for the traffic flow at the first device, wherein the set excludes at least one security task of a plurality of security tasks identified by the second device based on the tag information, wherein the at least one excluded security task is identified by the second device as being capable of being performed by a hardware accelerator of the second device; and
performing for the traffic flow, by the first device, each task in the set of security tasks.

14. The computer-implemented method of claim 13, wherein, after receiving the indication of the set of security tasks, further comprising sending the traffic flow from the first device to the second device.

15. The computer-implemented method of claim 13, wherein the first device is an endpoint device and the second device is a network device.

16. The computer-implemented method of claim 13, wherein the tag information includes information about resources of the first device, wherein the resource information indicates one or more of: processor utilization of one or more processors of the first device, memory utilization at the first device, processing resources available at the first device, memory resources available at the first device, or network bandwidth utilization at the first device.

17. The computer-implemented method of claim 13, further comprising:
sending the traffic flow from the first device to the second device; and after sending the traffic flow from the first device to the second device, receiving a different security task allocation from the second device to perform at the first device, the different security task allocation based on one or more of: threat perception based on other traffic flows received by the second device, or a time since the first device or the second device joined the network.

18. A system comprising:
a first device configured to communicate over a network, the first device comprising:
   a first device processor coupled to a first device computer readable medium having first device software instructions stored thereon that, when executed by the first device processor, cause the first device processor to perform first network security operations including:
      generating tag information about a traffic flow, wherein the tag information includes one or more characteristics of the traffic flow; and
      communicating the tag information prior to the traffic flow being sent by the first device via the network; and
a second device configured to perform a plurality of security tasks and to communicate over the network, the second device comprising:
   a second device processor coupled to a second device computer readable medium having second device software instructions stored thereon that, when executed by the second device processor, cause the second device processor to perform second device network security operations including:
      receiving, from the first device via the network, the tag information over the network;
      identifying a subset of the plurality of security tasks to be performed for the traffic flow, based at least in part on the tag information, wherein the second device includes a hardware accelerator, and wherein identifying the subset of the plurality of security tasks includes:
         determining that the subset of the plurality of security tasks are capable of being performed by the hardware accelerator,
         determining that at least one security task is not to be performed by the hardware accelerator, and
         excluding the at least one security task from the subset; and
      performing for the traffic flow each task in the subset of the plurality of security tasks, wherein performing each task in the subset of the plurality of security tasks includes performing one or more tasks of the subset of the plurality of security tasks by the hardware accelerator.

19. The system of claim 18, wherein the second device network security operations further comprise allocating, by the second device, performance of security tasks of the plurality of security tasks to the second device and to the first device based on the tag information, wherein the allocating is based, at least in part, on one or more of: threat perception based on other traffic flows received by the second device, or a time since the first device or the second device joined the network.

20. The system of claim 18, further comprising changing roles of the first device and the second device for network security dynamically such that the second device performs one or more of the at least one security task of the plurality of security tasks and the first device performs one or more of the subset of the plurality of security tasks.

\* \* \* \* \*